United States Patent
Brown et al.

[11] Patent Number: 5,586,277
[45] Date of Patent: Dec. 17, 1996

[54] METHOD FOR PARALLEL STEERING OF FIXED LENGTH FIELDS CONTAINING A VARIABLE LENGTH INSTRUCTION FROM AN INSTRUCTION BUFFER TO PARALLEL DECODERS

[75] Inventors: Gary L. Brown, Aloha; Donald D. Parker, Portland, both of Oreg.

[73] Assignee: Intel Corporation, Santa Clara, Calif.

[21] Appl. No.: 479,867

[22] Filed: Jun. 7, 1995

Related U.S. Application Data

[63] Continuation of Ser. No. 204,601, Mar. 1, 1994, abandoned.

[51] Int. Cl.$^6$ ............................................. G06F 9/30
[52] U.S. Cl. ............................................. 395/386
[58] Field of Search ............................ 395/375, 452, 395/421.09, 250

[56] References Cited

U.S. PATENT DOCUMENTS

| | | | |
|---|---|---|---|
| 4,050,058 | 9/1977 | Garlic . | |
| 4,199,811 | 4/1980 | Borgerson et al. . | |
| 4,342,078 | 7/1982 | Tredennick et al. . | |
| 4,376,976 | 3/1983 | Lahti et al. . | |
| 4,394,736 | 7/1983 | Bernstein et al. | 395/400 |
| 4,399,505 | 8/1983 | Druke et al. | 395/375 |
| 4,591,972 | 5/1986 | Guyer et al. | 395/375 |
| 4,654,781 | 3/1987 | Schwartz et al. | 395/425 |
| 4,745,544 | 5/1988 | Renner et al. | 395/275 |
| 4,875,160 | 10/1989 | Brown, III . | |
| 4,928,223 | 5/1990 | Dao et al. | 395/375 |
| 5,005,118 | 4/1991 | Lenoski . | |
| 5,101,344 | 3/1992 | Bonet et al. | 395/375 |
| 5,129,067 | 7/1992 | Johnson | 395/375 |
| 5,168,571 | 12/1992 | Hoover et al. | 395/800 |
| 5,202,967 | 4/1993 | Matsuzaki et al. | 395/375 |
| 5,222,244 | 6/1993 | Carbine et al. | 395/800 |
| 5,233,694 | 8/1993 | Hotta et al. | 395/375 |
| 5,235,686 | 8/1993 | Bosshart | 395/375 |
| 5,293,592 | 3/1994 | Fu et al. | 395/375 |
| 5,371,864 | 12/1994 | Chuang | 295/375 |

OTHER PUBLICATIONS

Popescu, et al., "The Metaflow Architecture", *IEEE*, 1991, pp. 10–13 and pp. 63–73.
Johnson, Mike, "Superscalar Microprocessor Design", *Prentice Hall, Inc.*, 1991, pp. 1–287.

*Primary Examiner*—Richard L. Ellis
*Assistant Examiner*—Gautam R. Patel
*Attorney, Agent, or Firm*—Blakely, Sokoloff, Taylor & Zafman

[57] ABSTRACT

A circuit and method for simultaneously steering multiple aligned macroinstructions from an instruction buffer to a decoder that receives and decodes multiple macroinstructions in parallel. A first macroinstruction is supplied to a first decoder by steering a first predetermined number of bytes following the first buffer byte. A second macroinstruction is supplied by scanning a first opcode byte vector to locate a first opcode byte, and then steering a second predetermined number of bytes beginning at said first opcode to a second decoder. Operations to locate the first byte of each of the macroinstructions and to steer them to the decoders are accomplished in one cycle. If said macroinstruction cannot be decoded by said second decoder, then it is resteered to the first decoder. Steering and resteering operations continue until all complete macroinstructions within the instruction buffer have been accepted by the decoders.

23 Claims, 16 Drawing Sheets

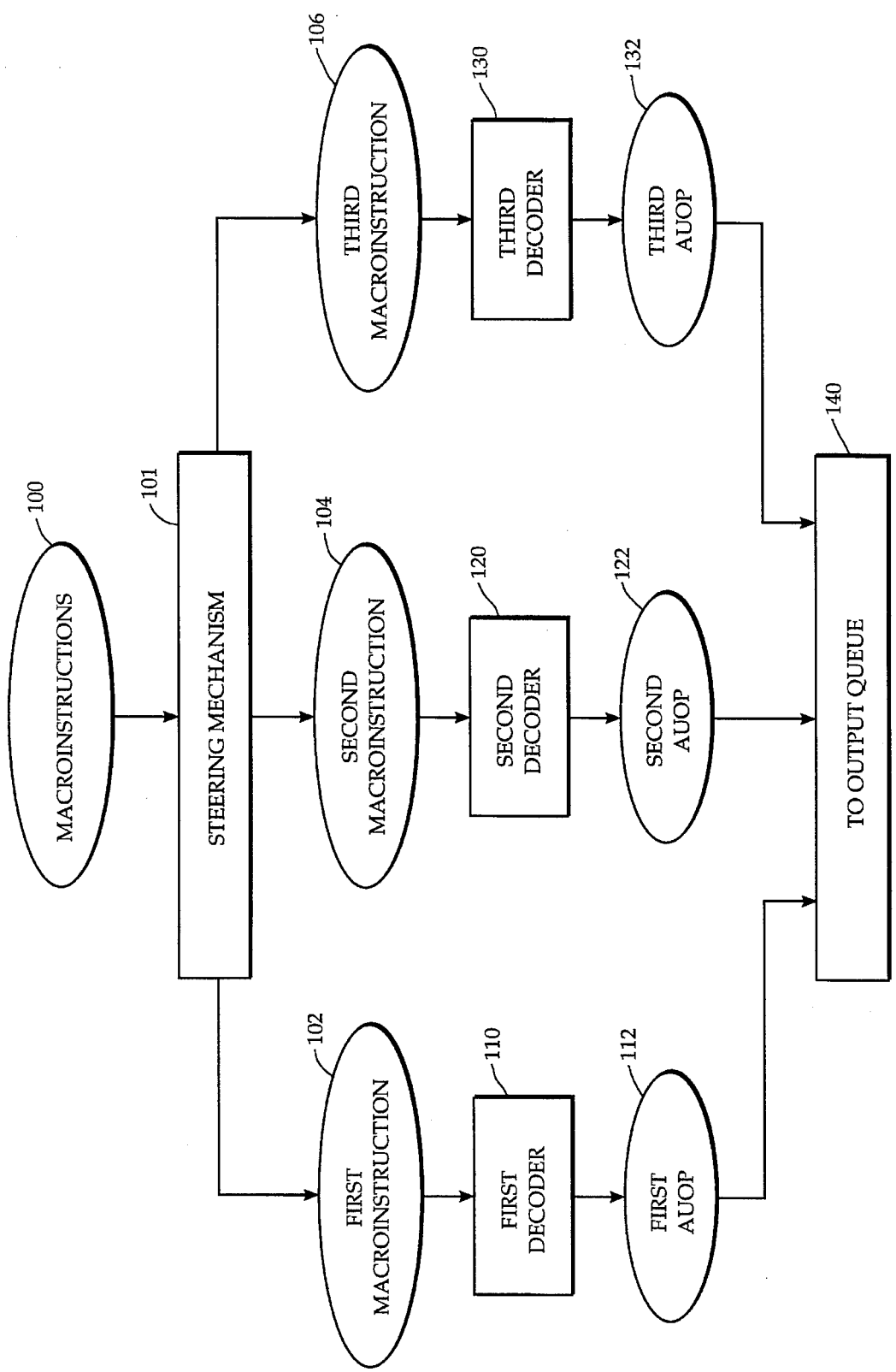
FIG_1

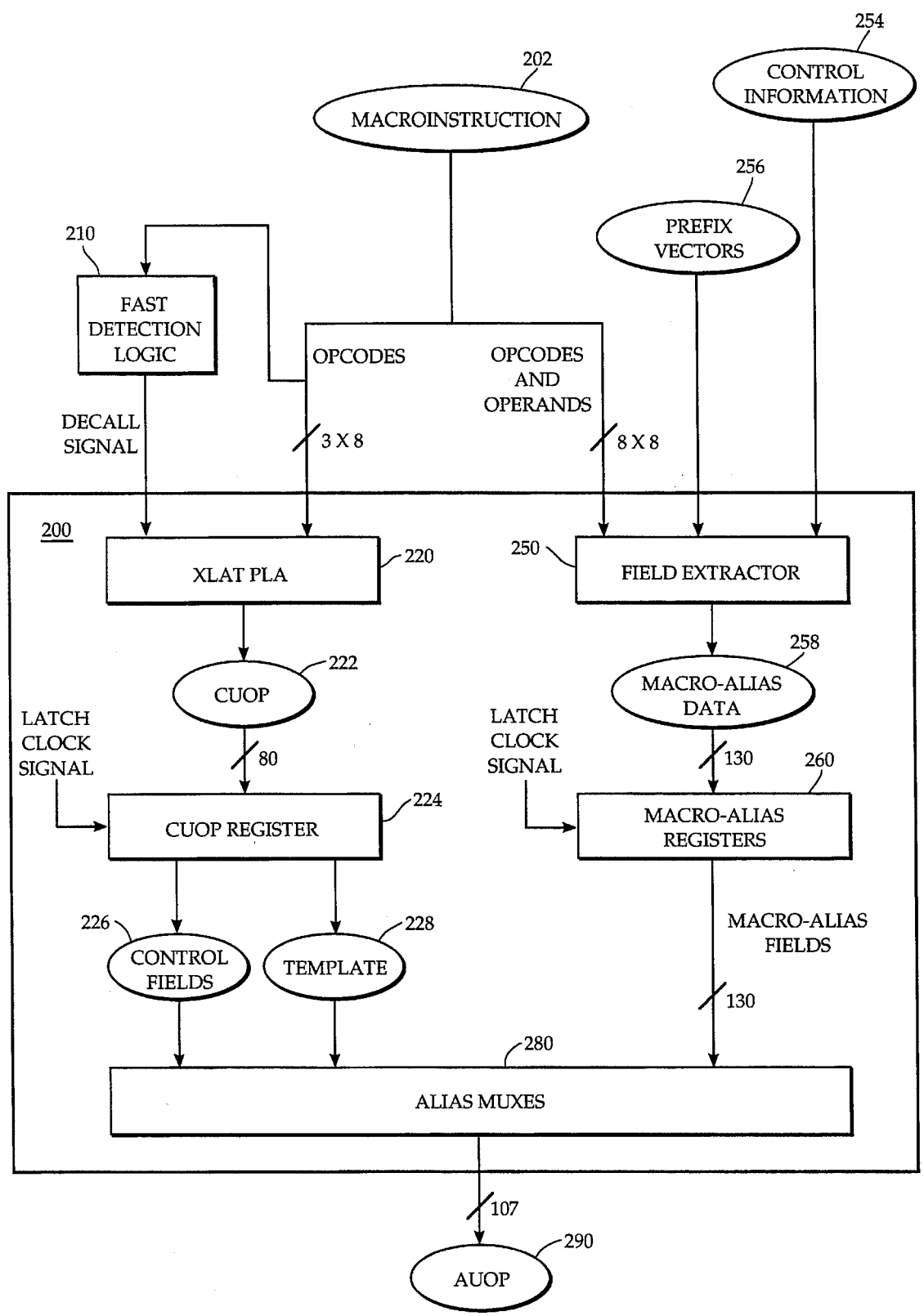
FIG_2

| VALID BIT | CONTROL FIELD FOR INDIRECT ACCESS OF OTHER REGISTERS | OPCODE FIELD | SRC1 | SRC2 | DEST | IMMEDIATE | ⋮ |
|---|---|---|---|---|---|---|---|
| 310 | 226 | 330 | 340 | 342 | 344 | 350 | |

224

FIG_3

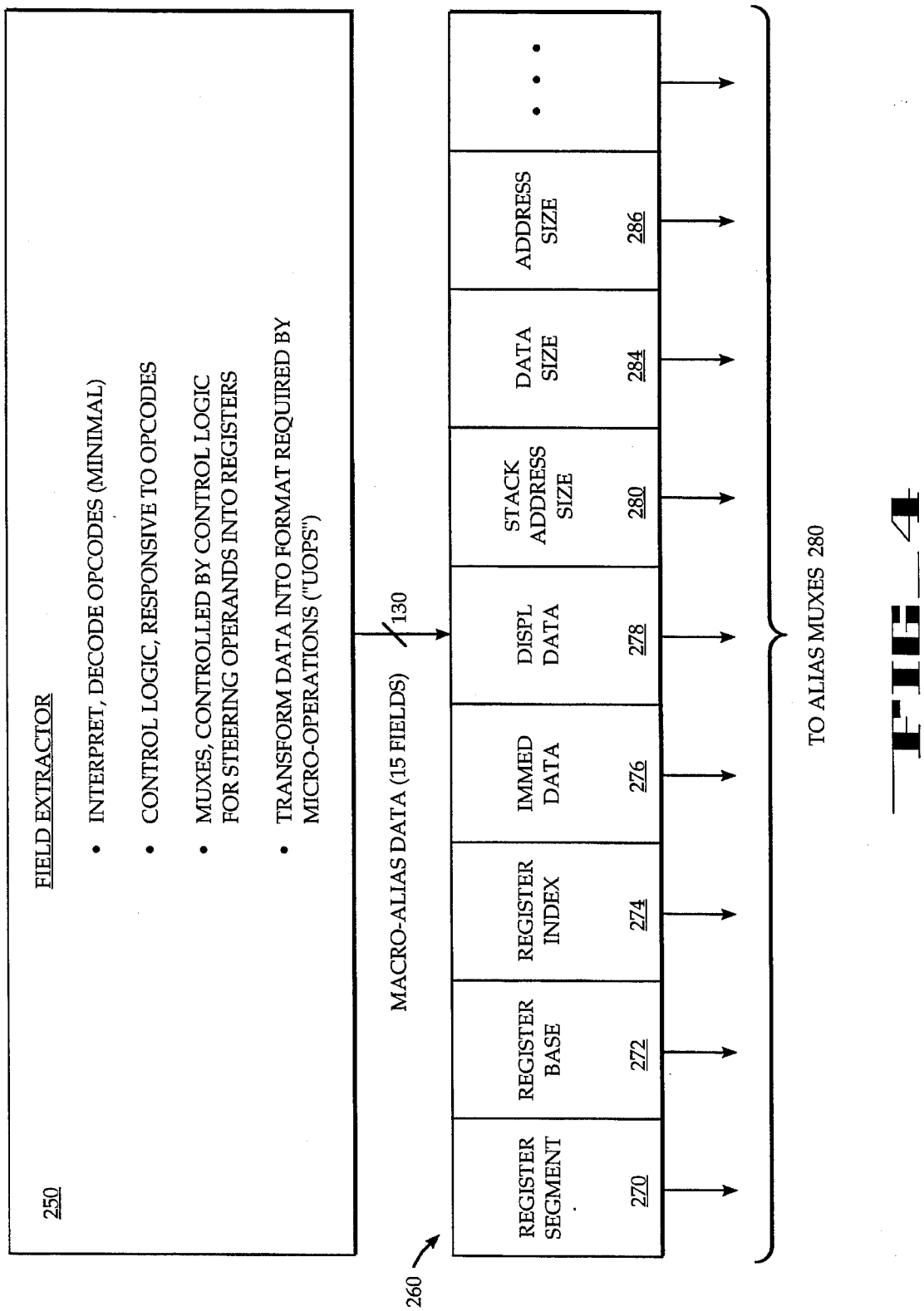
FIG._4

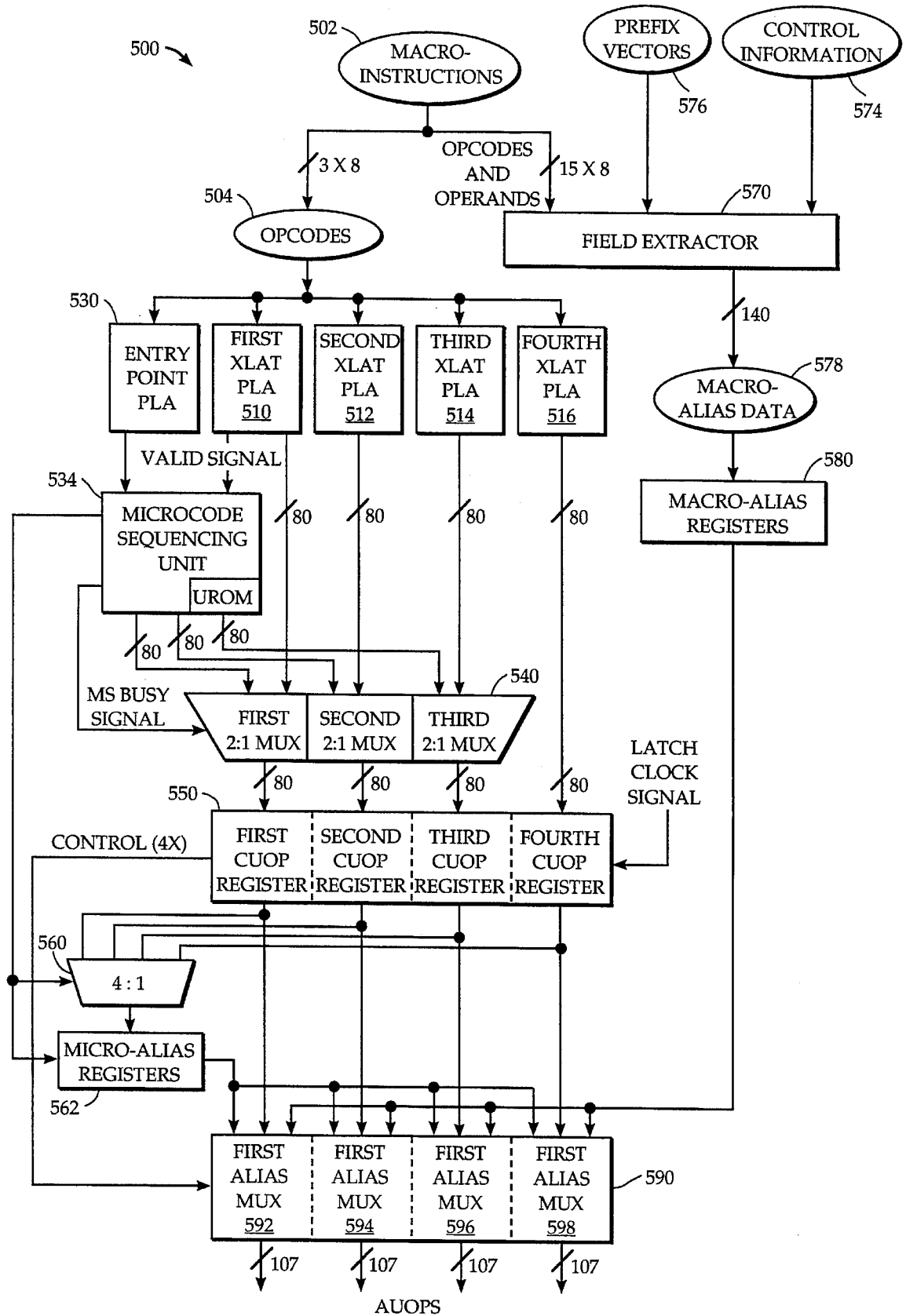
FIG_5

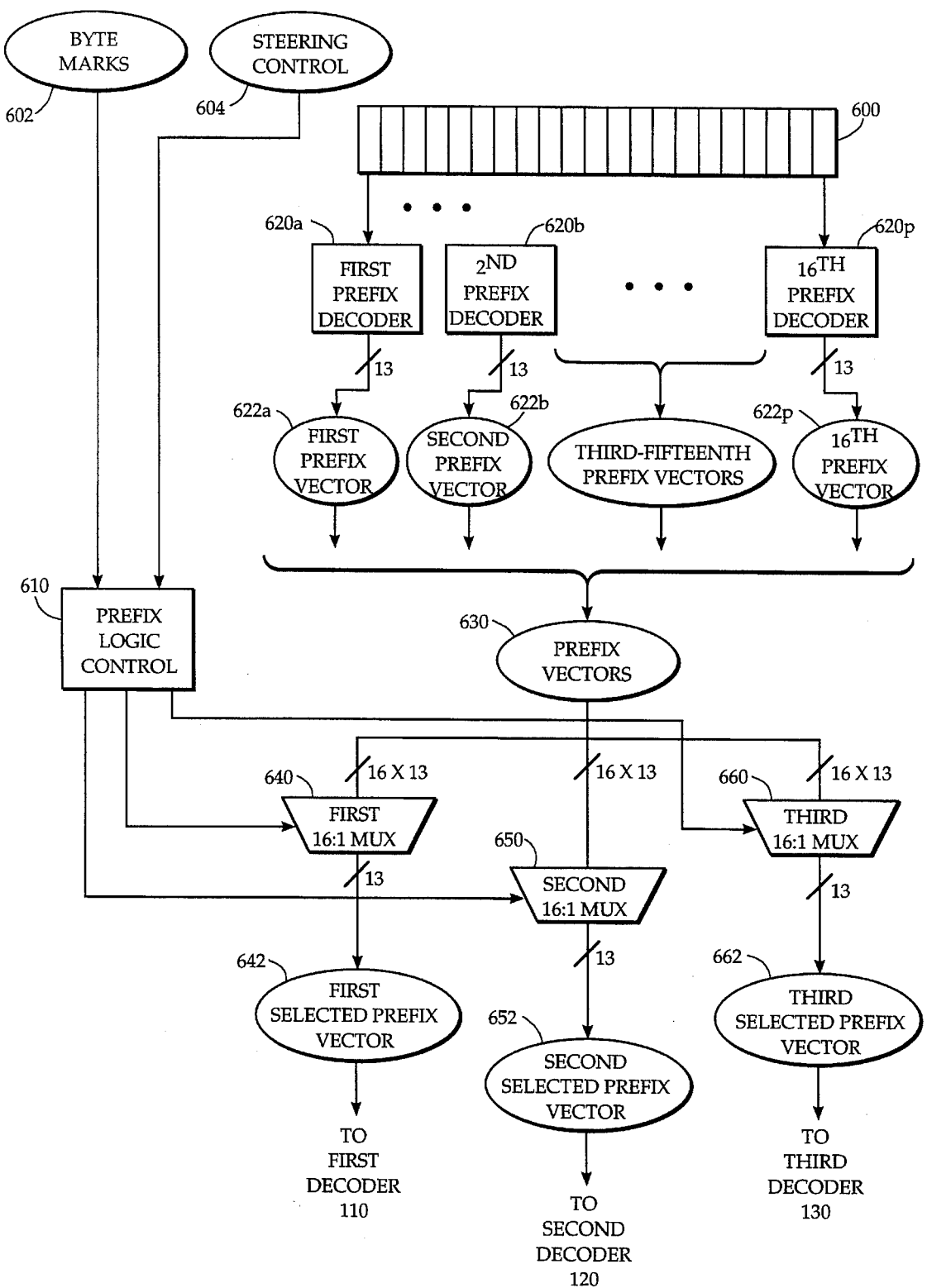
FIG_6

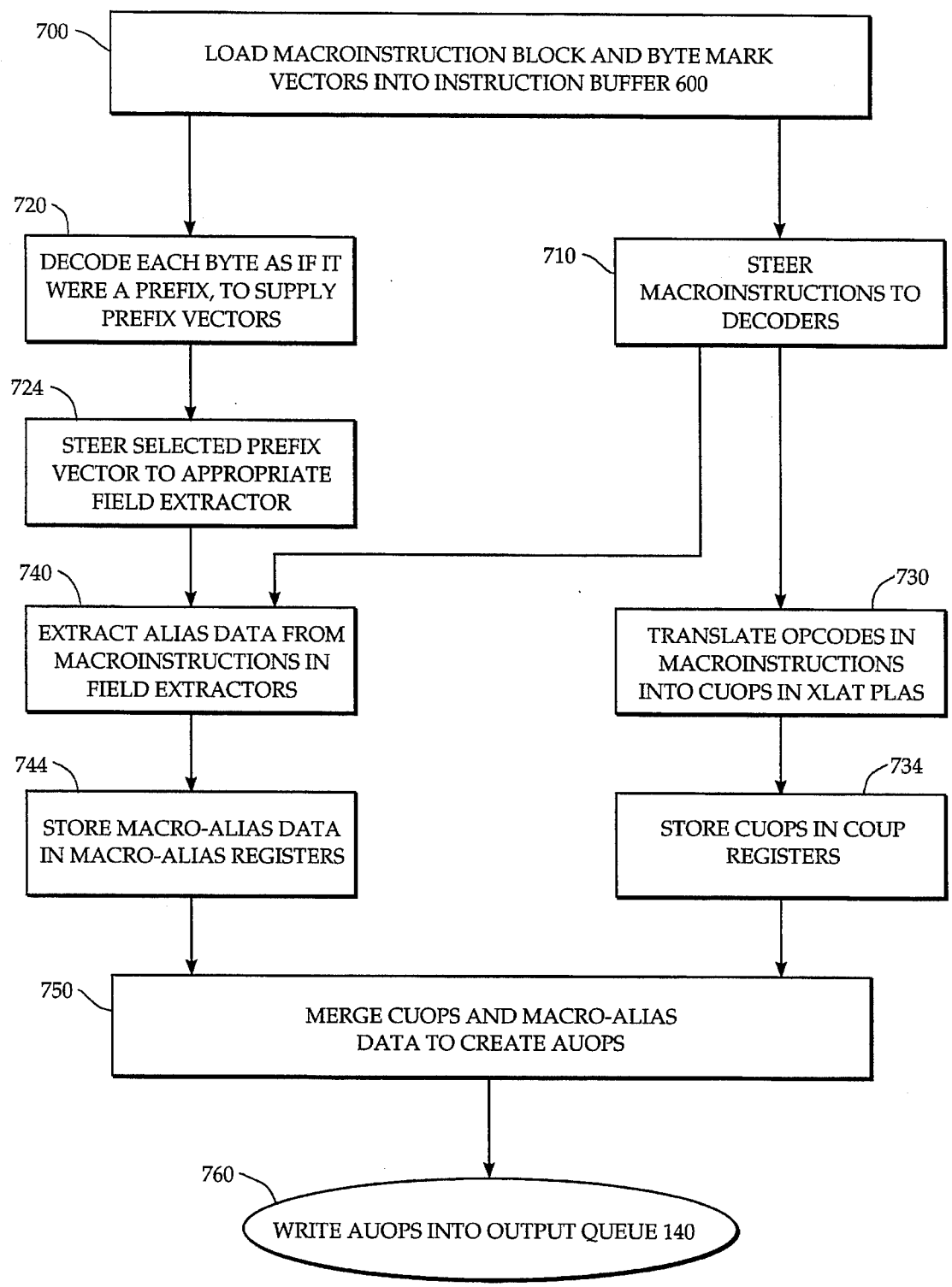
FIG_7

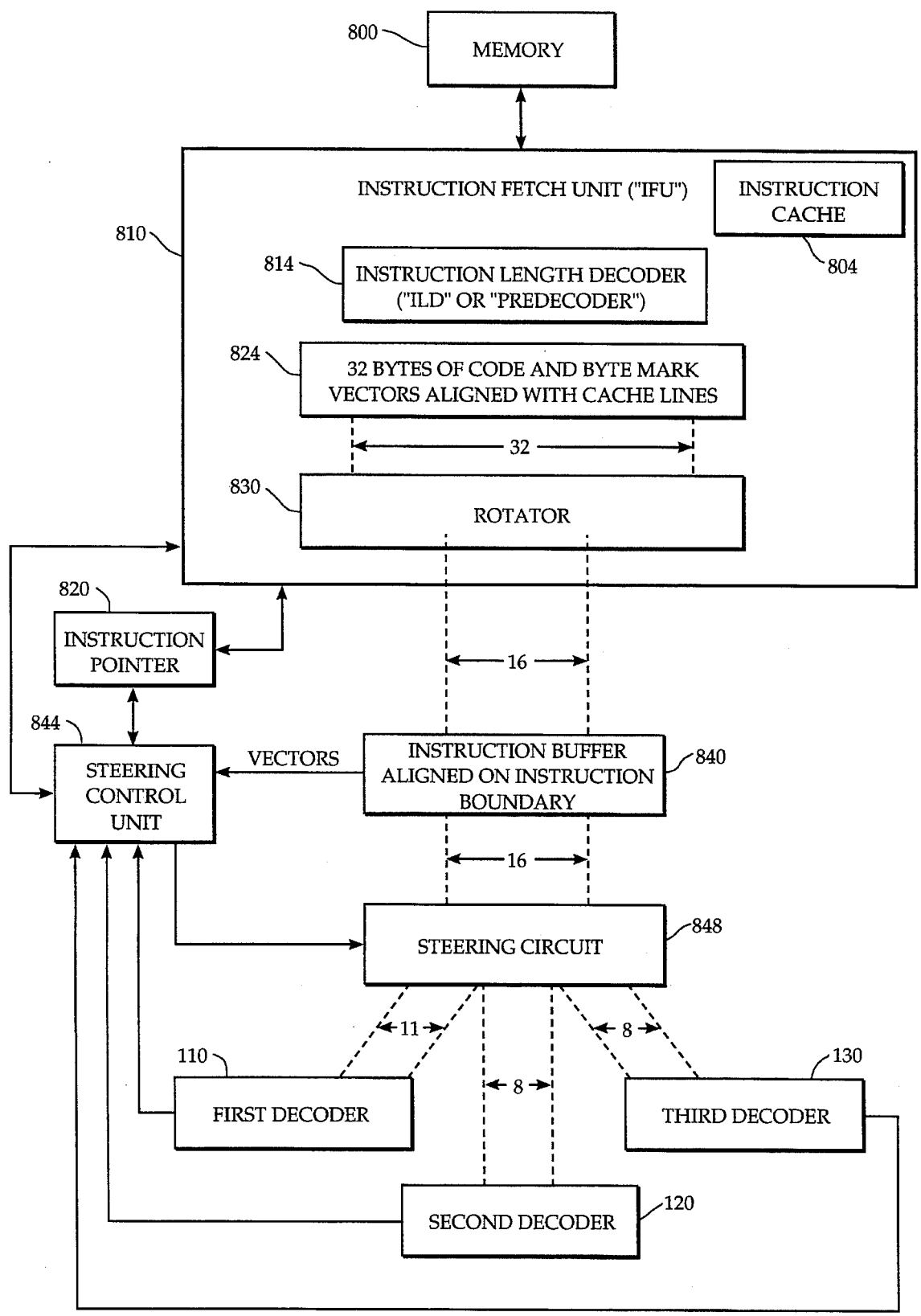
FIG_8

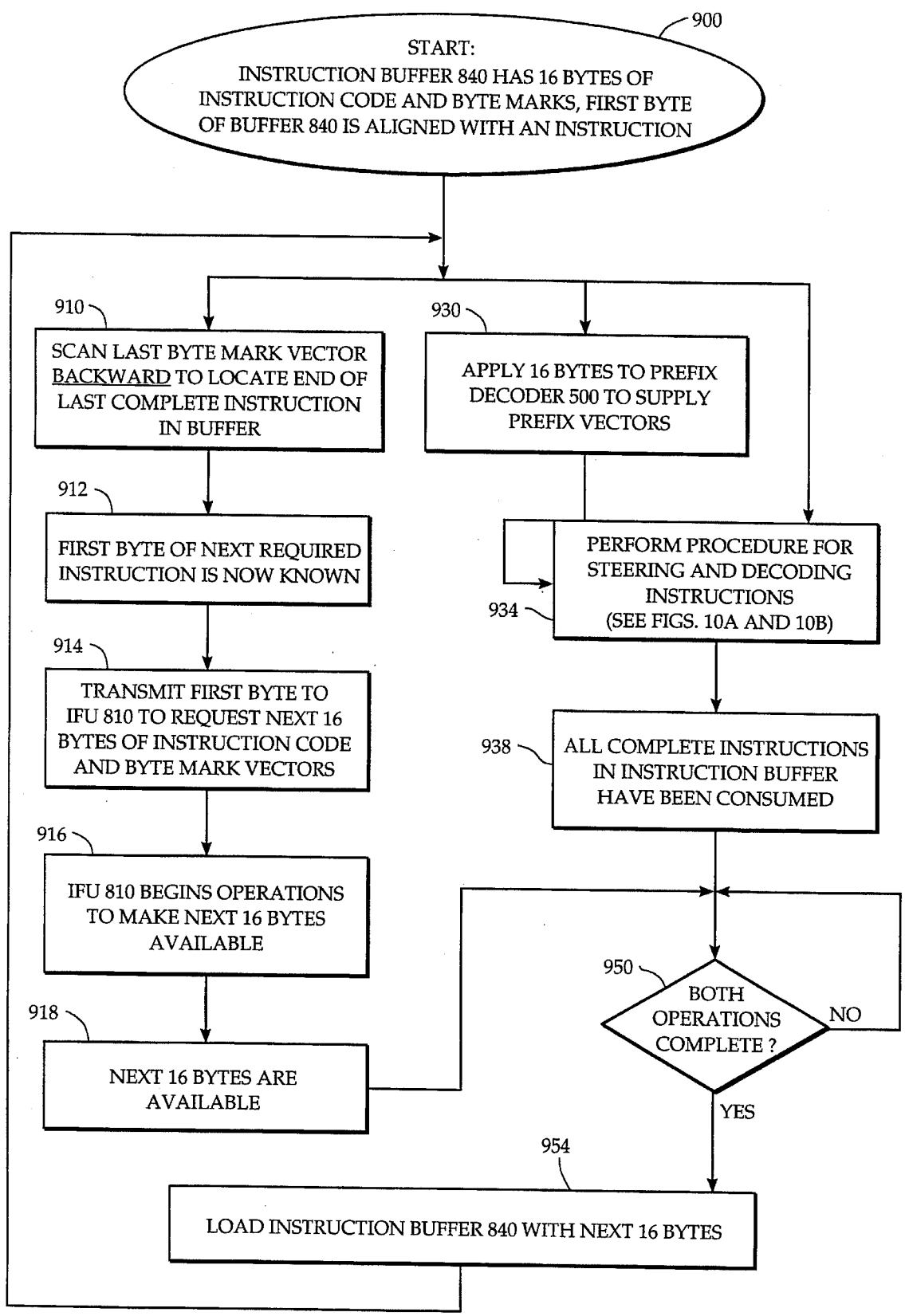
FIG_9

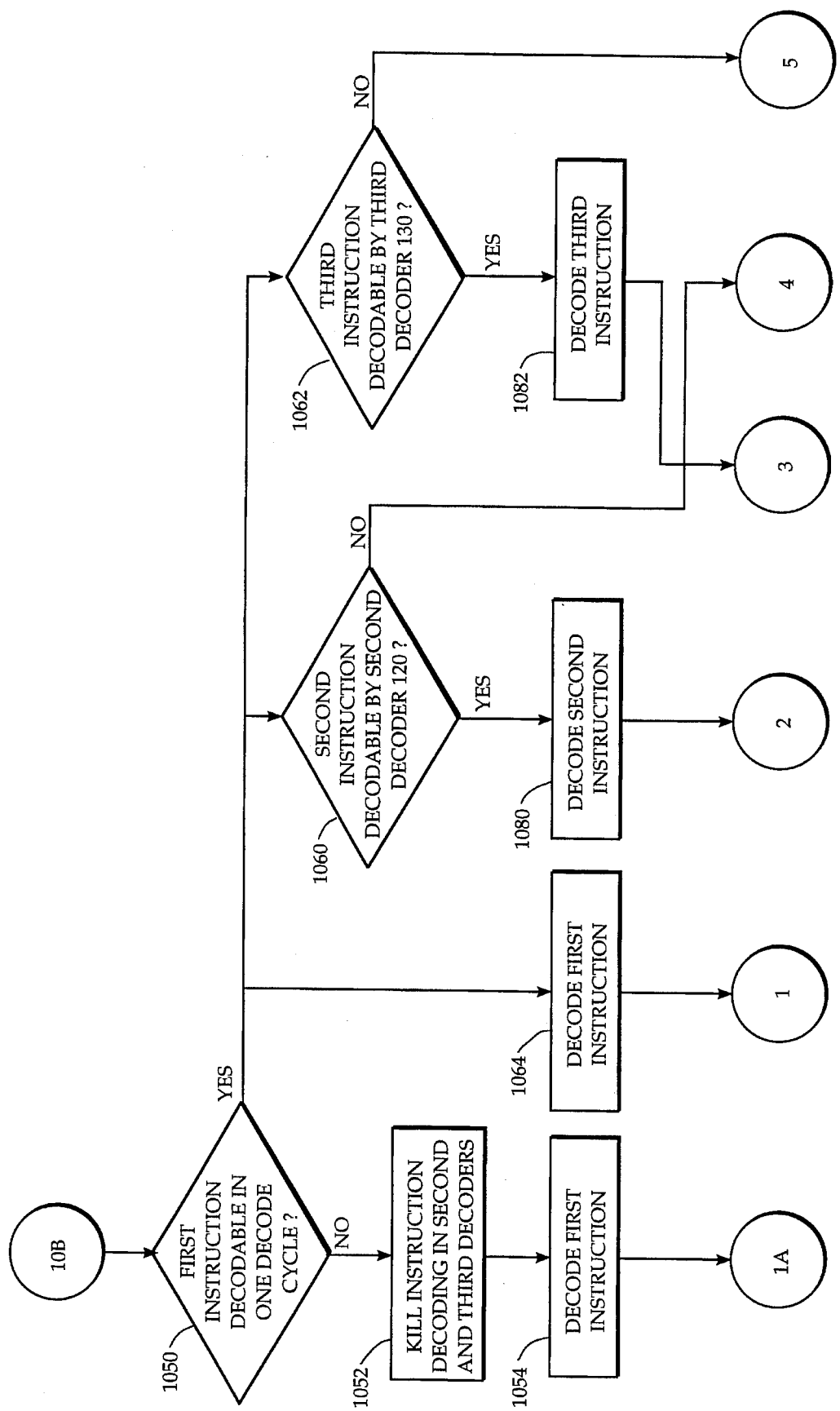
FIG._10B

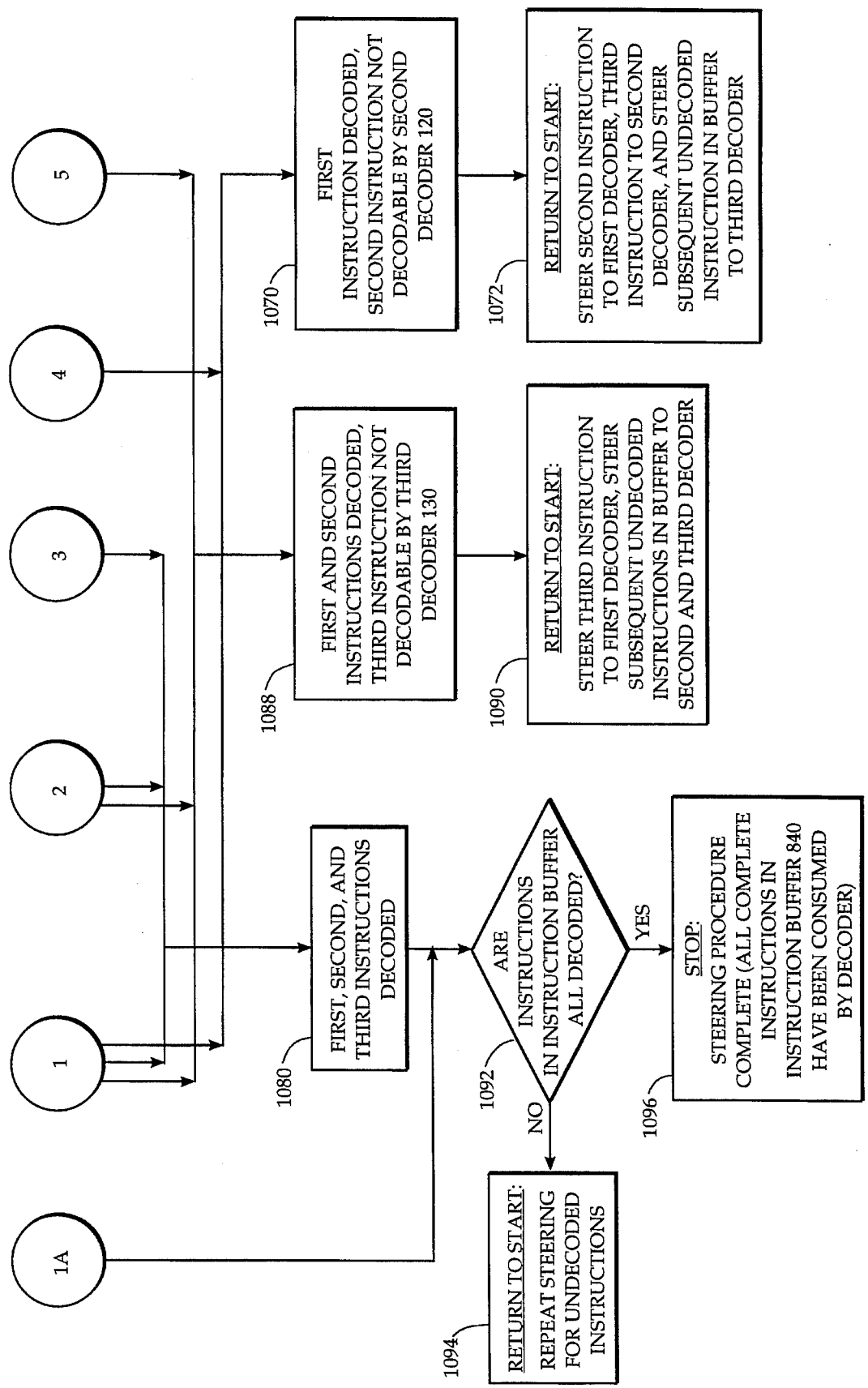
FIG._10C

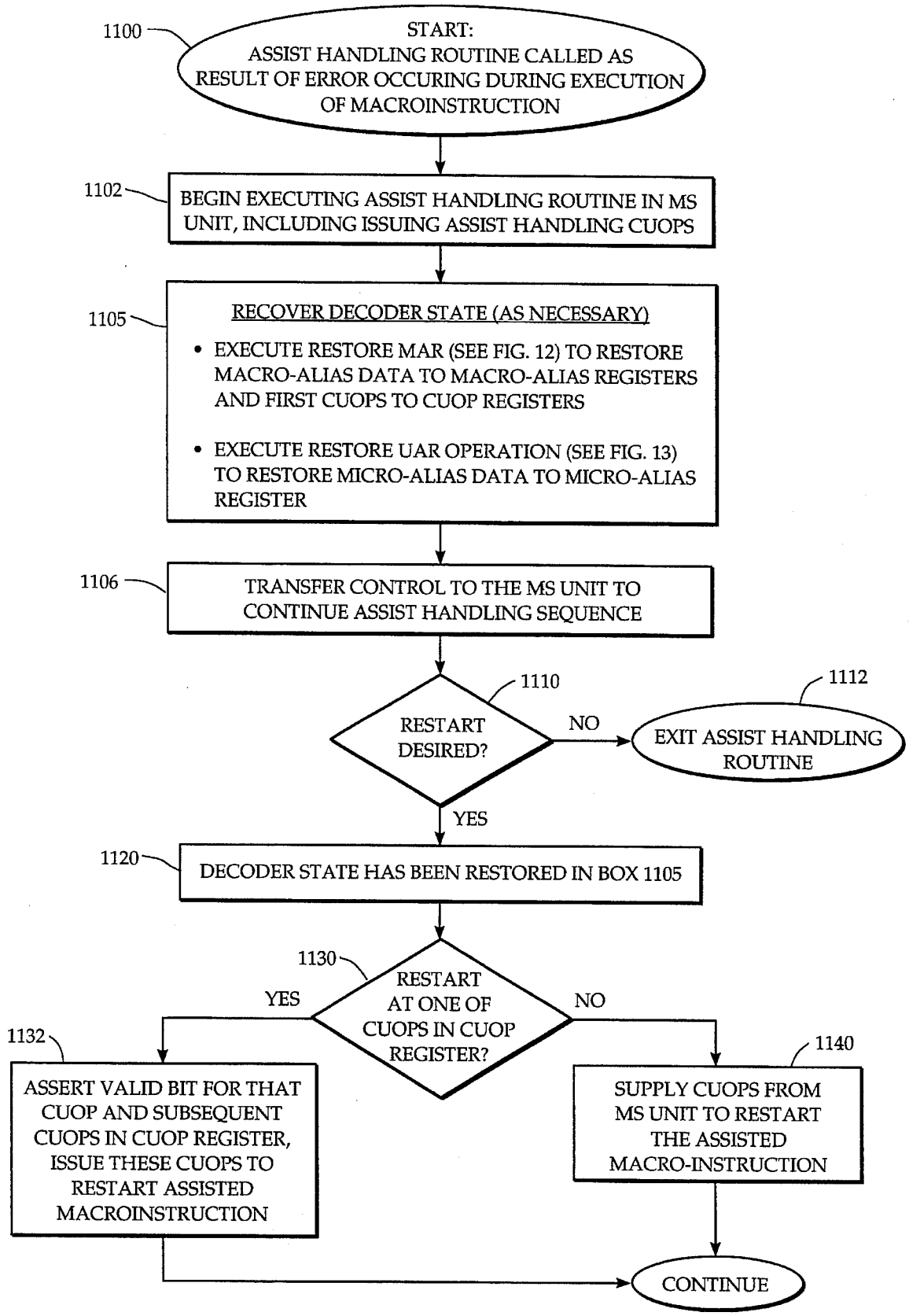
FIG_11

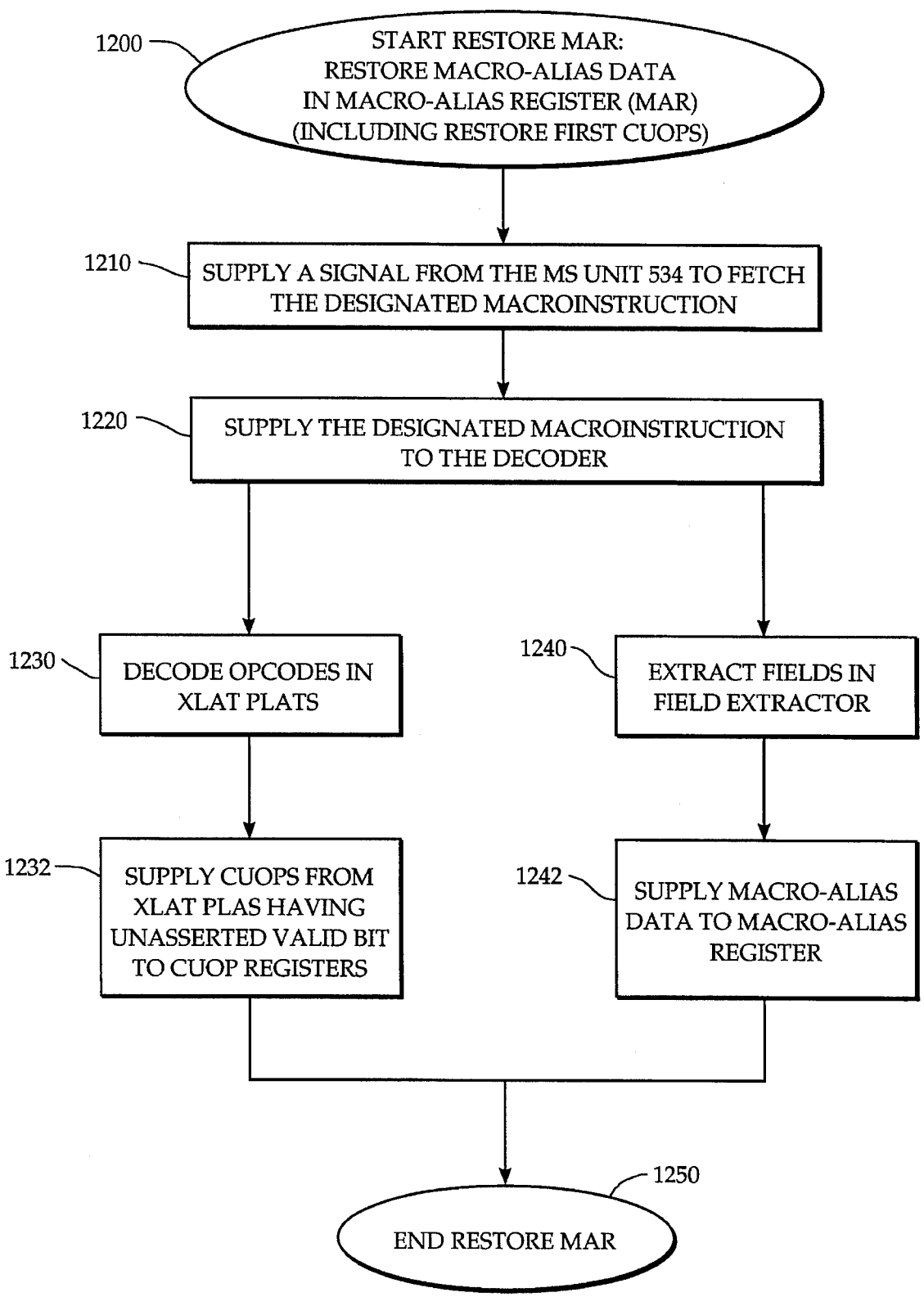
FIG_12

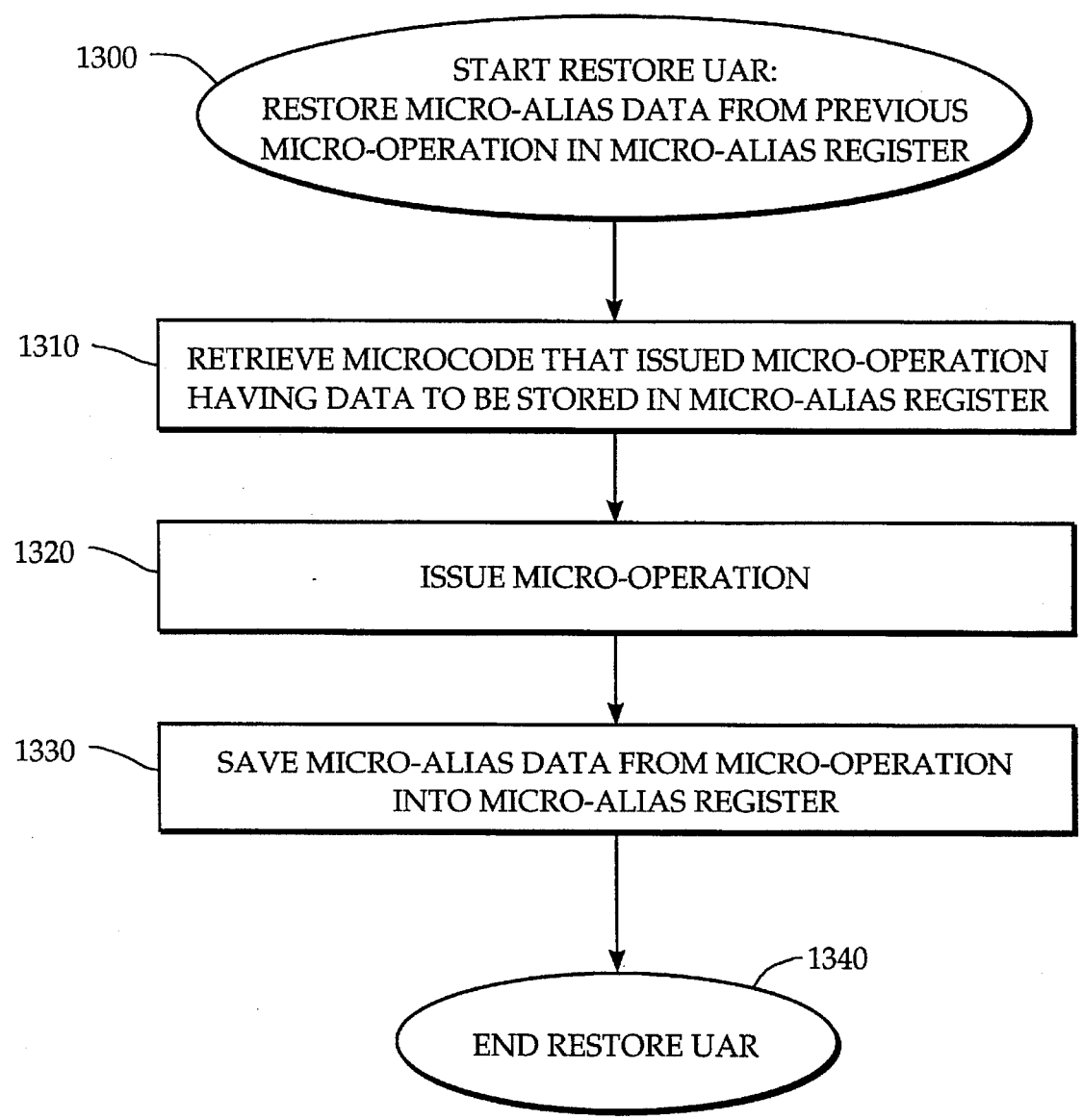
FIG_13

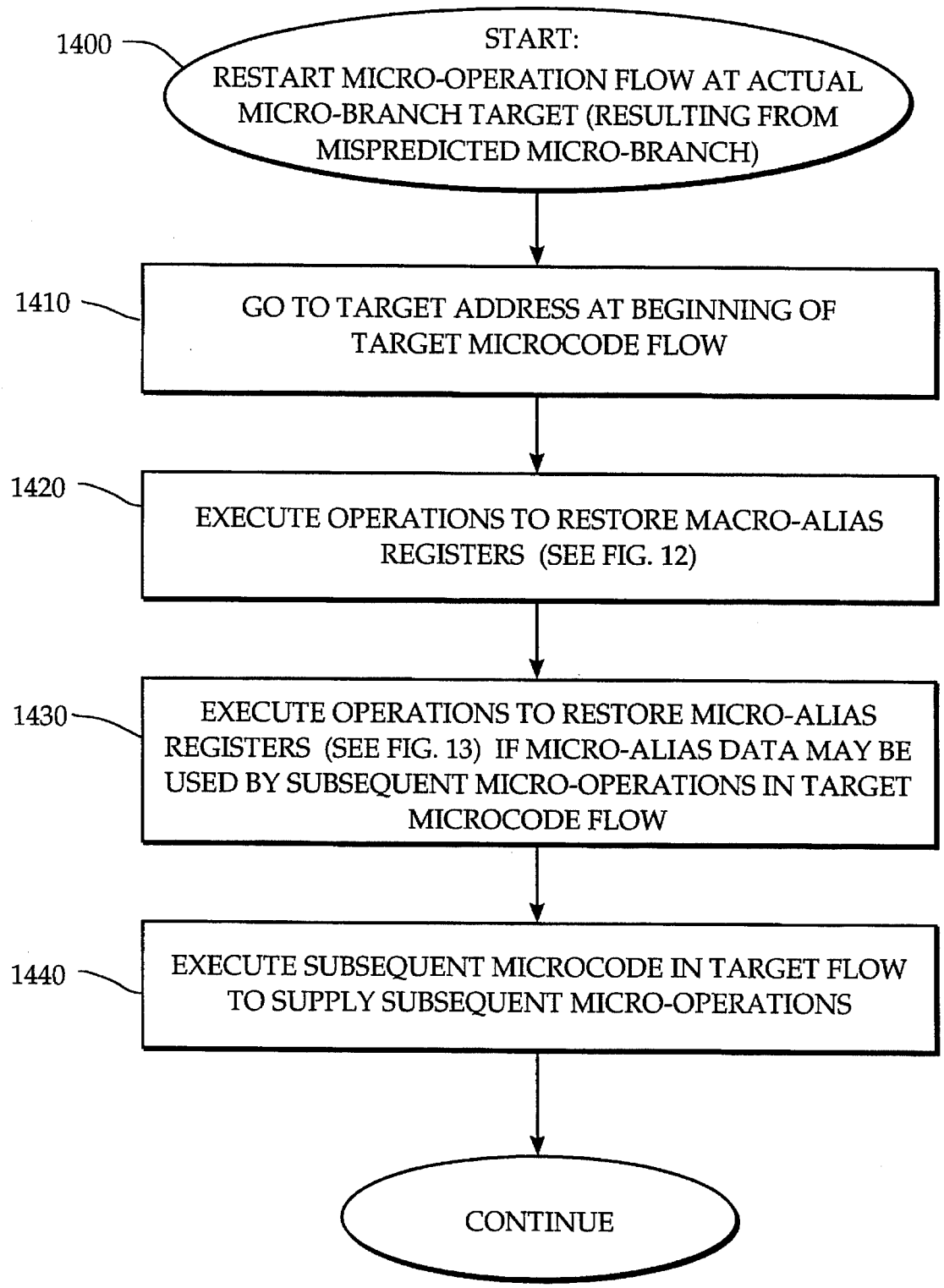
FIG_14

METHOD FOR PARALLEL STEERING OF FIXED LENGTH FIELDS CONTAINING A VARIABLE LENGTH INSTRUCTION FROM AN INSTRUCTION BUFFER TO PARALLEL DECODERS

This is a continuation of application Ser. No. 08/204,601, filed Mar. 1, 1994, now abandoned.

CROSS-REFERENCE TO RELATED APPLICATIONS

Cross-reference is made to the following commonly assigned copending patent applications: Ser. No. 08/204,602, entitled "A Decoder for Decoding Multiple Instructions in Parallel", filed Mar. 7, 1994, by Carbine et al.; Ser. No. 08/204,593, entitled "A Decoder for Single Cycle Decoding of Single Prefixes in Variable Length Instructions", filed Mar. 1, 1994, by Brown, et al., now U.S. Pat. No. 5,537,629, Ser. No. 08/204,744, entitled "A Method for State Recovery During Assist and Restart in a Decoder Having an Alias Mechanism", filed Mar. 1, 1994, by Boggs, et al.; Ser. No. 08/204,600, entitled "A Decoder Having Independently Loaded Alias Registers Accessible Simultaneously by One Micro-Operation", filed Mar. 1, 1994, by Boggs et al., now abandoned, Ser. No. 08/204,862, entitled "A Method and Apparatus for Aligning an Instruction Boundary in Variable Length Macroinstructions with an Instruction Buffer", filed Mar. 1, 1994, by Brown et al.; and Ser. No. 08/205,022, entitled "Dual Instruction Buffers with a Bypass Bus and Rotator for a Decoder of Multiple Instructions of Variable Length" filed Mar. 1, 1994, by Gupta et al; which are incorporated by reference herein.

BACKGROUND OF THE INVENTION

1. Field of the Invention

The present invention relates to steering multiple macroinstructions to a decoder that decodes multiple macroinstructions in parallel.

2. Description of Related Art

Computers process information by executing a sequence of instructions, which may be supplied from a computer program written in a particular format and sequence designed to direct the computer to operate a particular sequence of operations. Most computer programs are written in high level languages such as FORTRAN or "C" which are not directly executable by the computer processor. In order to execute these high level instructions they must first be translated into macroinstructions with a format that can be decoded and executed within the processor.

Macroinstructions are conventionally stored in data blocks having a predefined length in a computer memory element, such as main memory or an instruction cache. Macroinstructions are fetched from the memory elements and then supplied sequentially to a decoder, in which each macroinstruction is decoded into one or more micro-operations having a form that is executable by an execution unit in the processor.

Pipelined processors define multiple stages for processing a macroinstruction. These stages are defined so that a typical instruction can complete processing in one cycle and then move on to the next stage in the next cycle. In order to obtain maximum efficiency from a pipelined processing path, the decoder and subsequent execution units must process instructions as frequently as possible. In other words, their idle time should be kept to a minimum. Accordingly, it is advantageous if at least one new macroinstruction can be steered to the decoder every cycle. In order to supply at least one instruction per clock, a block of instruction code at the most likely location is pre-fetched so that it can be supplied to an instruction buffer when requested.

Variable length instructions can be difficult to locate and align within a block of instruction code. Particularly, in the i486™ INTEL instruction set, implemented by processors such as the i486™ microprocessor instruction lengths vary between one and fifteen bytes. The existence of variable length instructions creates difficulties in locating instruction boundaries. An "instruction boundary" is defined as the location between adjoining macroinstructions in the instruction code. Furthermore, in the i486™ INTEL instruction set, the possibility that one or more prefix bytes precede the first opcode byte of an instruction creates additional difficulties. Due to the prefix bytes, the first opcode byte in a macroinstruction may not be equivalent to the first byte of the complete macroinstruction. Even if the first opcode byte were to be located, the first macroinstruction byte would still not be known, because the existence, and the number of prefix bytes can vary from instruction to instruction.

Because of the above difficulties, it can be difficult to supply even one variable length macroinstruction to a decoder. This problem is even more difficult if multiple variable length instructions are simultaneously required by multiple decoders such as those in the high performance superscalar systems.

It would be an advantage to provide a steering mechanism that can steer multiple macroinstructions aligned with a first opcode byte in every cycle to a multiple instruction decoder. Particularly, such a steering mechanism would be useful for a multiple instruction decoder that can issue multiple micro-operations to a high performance execution unit that executes more than one micro-operation per cycle.

SUMMARY OF THE INVENTION

A circuit and method is described herein for simultaneously steering multiple macroinstructions, each aligned with its first opcode byte, from an instruction buffer to a decoder that receives and decodes multiple macroinstructions in parallel. The circuit and method is particularly useful for variable length instructions such as the instructions in the i486™ INTEL instruction set that allow prefix bytes before the opcode bytes.

In the described embodiment, the method locates the first opcode of a first macroinstruction in the instruction buffer, and steers a first predetermined (fixed) number of bytes properly aligned with said first opcode byte to a first decoder regardless of whether those opcode bytes are preceded by one or more prefixes. In the same cycle, the method locates a first opcode of a second macroinstruction, and steers a second predetermined number of bytes beginning with said first byte of said second macroinstruction to a second decoder.

The first and second macroinstruction can be steered quickly, in one cycle. Quick steering is facilitated by supplying a predetermined number of bytes to each decoder, instead of the actual number of bytes in the macroinstruction. Quick steering is also facilitated by scanning a first opcode vector that includes bits that function as first opcode byte markers. Particularly, each bit of the first opcode vector is associated with one byte of the instruction code within the instruction buffer. Each bit indicates whether or not its associated byte is the first opcode byte of a macroinstruction. Due to provision for prefix bytes, it is possible that the first opcode byte is not equivalent to the first byte of a macroinstruction. The first opcode vector is provided by a predecoder that examines all blocks of instruction code before supplying them to the instruction buffer.

Alignment of each macroinstruction with its first opcode byte, rather than its first byte, advantageously allows the opcodes of each macroinstruction to be supplied properly aligned to the XLAT PLAs of the decoder. Thus, opcode decoding is simplified because the XLAT PLAs are not required to decode prefix bytes together with opcodes. Prefix decoding is handled by a separate mechanism.

In the described embodiment, the first decoder is a full decoder that can decode all macroinstructions, while the second decoder is a partial decoder that can only decode a subset of macroinstructions of the complete instruction set. Therefore, the first predetermined number of bytes supplied to the first decoder equals the maximum number of bytes allowed in a macroinstruction. The second predetermined number of bytes supplied to the second decoder is less than the maximum number, thereby reducing the data path size for the second decoder. In some instances, the second macroinstruction cannot be decoded by the second decoder. For example, the second macroinstruction may be too long, or it may include opcodes not recognizable by the second decoder. In that instance, the second macroinstruction is resteered in a next cycle to the first decoder for decoding.

Operations to steer and resteer macroinstructions from the instruction buffer continue until all complete macroinstructions stored therein have been consumed by the decoders. An advantage of this feature is that all instructions within the instruction buffer are consumed before the next block of instruction code is rotated into the instruction block, thereby simplifying fetching and rotating the next block of instruction code into the instruction buffer.

BRIEF DESCRIPTION OF THE DRAWINGS

FIG. 1 is an overview of a multiple instruction decoder having multiple decoders including a first decoder, a second decoder, and a third decoder, each of which receives a macroinstruction and decodes it into one or more microoperations.

FIG. 2 is a block diagram of a partial decoder, such as the second decoder and third decoder, that can decode a subset of all executable macroinstructions.

FIG. 3 is a diagram of fields defined in the Cuop register.

FIG. 4 is a block diagram of the field extractor and the macro-alias registers, illustrating the registers defined within the macro-alias register.

FIG. 5 is a block diagram of a full decoder, such as the first decoder that can decode all executable macroinstructions.

FIG. 6 is a diagram of a prefix decoding circuit for decoding each byte of an instruction buffer, and selecting one of said decoded prefixes, as appropriate, to supply to each decoder.

FIG. 7 is a flow chart of operations to decode the macroinstructions into a plurality of Auops.

FIG. 8 is a block diagram of circuitry including a cache memory for storing instructions, an instruction fetch unit, and a steering mechanism for steering instructions to multiple decoders.

FIG. 9 is a flow chart of operations to load the instruction buffer with one or more variable length macroinstructions, stored so that the first byte of a first macroinstruction is aligned with the first byte of the instruction buffer.

FIG. 10B is a continuation of the flow chart of FIG. 10A.

FIG. 10C is a continuation of the flow chart of FIG. 10B.

FIG. 11 is a flow chart of operation of an assist handling routine, including state recovery.

FIG. 12 is a flow chart of operations to restore a macro-alias data and the first Cuops supplied from XLAT PLAs in an instruction flow.

FIG. 13 is a flow chart illustrating operations to restore micro-alias data into a micro-alias register.

FIG. 14 is a flow chart illustrating operations to restart a micro-operation flow at an actual micro-branch target, such as may result from a mispredicted micro-branch.

DETAILED DESCRIPTION OF THE PREFERRED EMBODIMENT

Figure 10A:
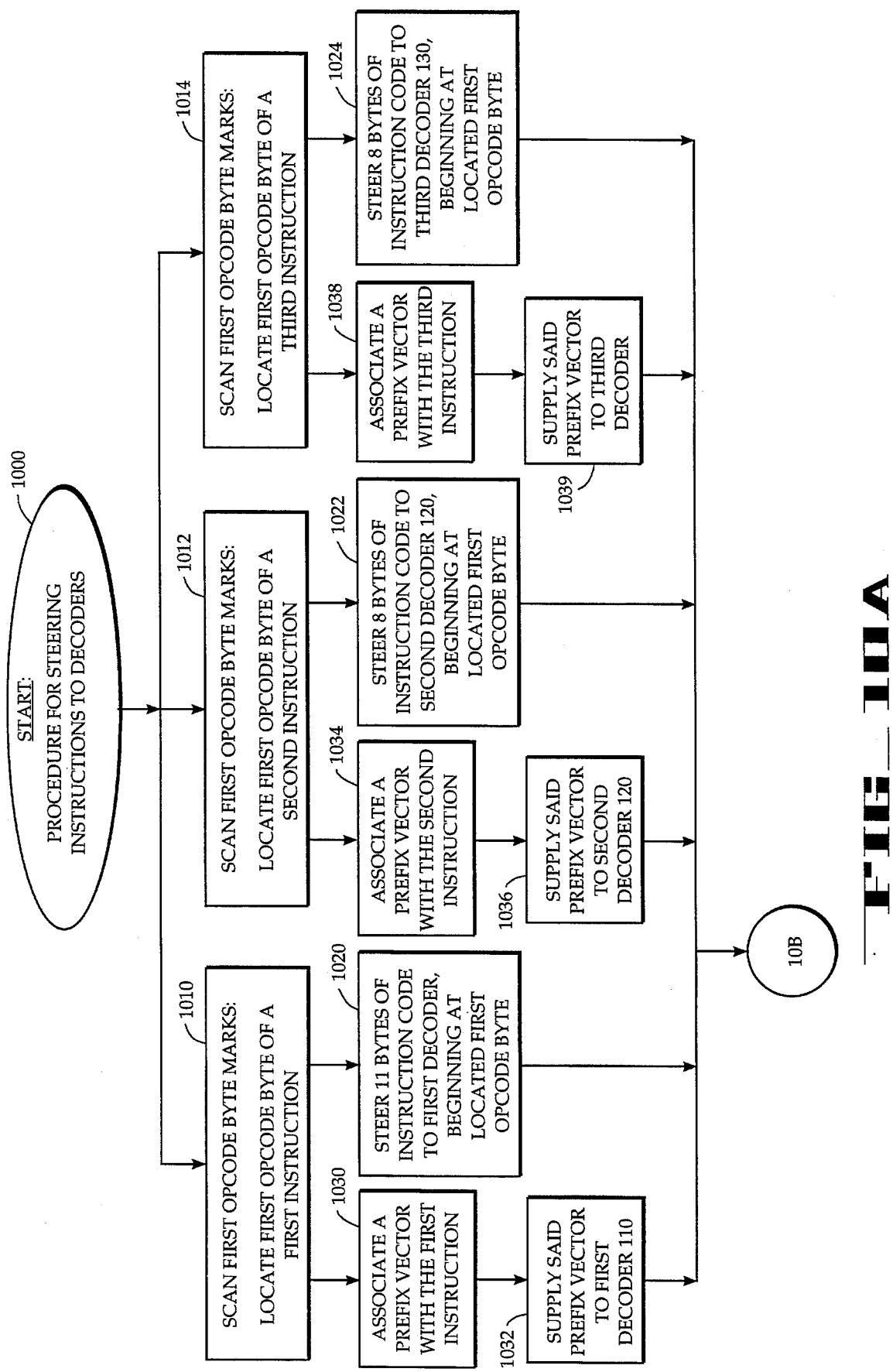
FIG. 10A is a flow chart that illustrates a procedure for steering multiple variable length instructions from the instruction buffer to multiple decoders.

FIGS. 1 through 14 of the drawings disclose various embodiments of the present invention for purposes of illustration only. One skilled in the art will readily recognize from the following discussion that alternative embodiments of the structures and methods illustrated herein may be employed without departing from the principles of the invention. The following description may include specific numbers and quantities associated with the apparatus and method described therein. For example, the processing apparatus and methods described herein can be practiced in a single microprocessor chip, or multiple chips, or in software. The chips may be made of silicon or other semiconductor material. Also, it should be apparent to one skilled in the art that the numbers and quantities utilized herein for illustrative purposes, for example the number of bits in a particular field can vary between embodiments.

Discussion of Variable Length Instructions and Prefixes

The system described herein is particularly useful for decoding a sequence of variable length instructions that form a portion of a computer program. In the preferred implementation, the instructions supplied to the decoder (termed "macroinstruction") have the well-known format of the INTEL instruction set which is described, for example, in detail in the *i486™ Programmers Reference Manual*, 1990, Section 2.4, available from INTEL Corporation. In this format, a macroinstruction can be up to fifteen bytes in length.

Each macroinstruction includes at least one opcode byte, which specifies the operation performed by the instruction. The length of an instruction is variable; i.e., the instructions have no set fixed length. For example, in one sequence of instructions, the first instruction may comprise twelve bytes, the second instruction may comprise eight bytes, and the third instruction may comprise two bytes. There are certain format rules; for example, a macroinstruction is divided into sections that may include prefix bytes, followed by opcode bytes, which are followed by operand or other data bytes. The number, and even the existence of certain bytes is unknown with any certainty: the number of prefix bytes in a single macroinstruction may vary from zero to fourteen. The number of opcode bytes ranges from one to three, and the number of operand and other data bytes can vary from zero to eight. Prefixes, as used herein, are described with reference to the INTEL instruction set. Prefixes may include information relating to length of data, and control information regarding code segment override and data segment override. Furthermore, there may be one or more repeat prefixes, which indicate that an instruction is to be repeated a certain number of times. The *i486*™ *Programmers Reference Manual,* 1990, Section 2.4, "instruction format", pages 2-15 and 2-16, includes a complete discussion of the instruction format of the INTEL instruction set, which includes various prefix bytes available. Also, section 26.2 "Instruction Format" on page 26-2 includes such a discussion.

The decoder described herein is designed to decode the INTEL instruction set, which includes instructions executable in the INTEL microprocessors including the 8086, 8087, 80286, i386™, 80287, i486™ and the Pentium™ microprocessors. It should be apparent however, that the structures described herein could also be used with instruction sets other than the INTEL instruction set. The following description includes circuits and methods suitable for implementation in a microprocessor. It should be recognized, however, that the principles described herein could be utilized in other processors.

Overview

Reference is first made to FIG. 1 which is an overview of a multiple instruction decoder of the preferred embodiment which is a part of a pipeline including other processing units in a computer environment. As illustrated at 100, a plurality of macroinstructions are supplied via a steering mechanism 101, to be described in detail with reference to FIGS. 8, 9, 10A, 10B and 10C. Briefly, the steering mechanism 101 receives macroinstructions from an instruction buffer which is loaded by an instruction fetch unit that is coupled to memory or an instruction cache. For example, the macroinstructions may be fetched from memory or the instruction cache, and then stored in an instruction buffer for steering when needed by the decoders.

In the described embodiment, the macroinstructions include a first macroinstruction 102, a second macroinstruction 104, and a third macroinstruction 106. The macroinstructions 102–106 are provided in the sequence specified by the program structure. In other words, in the specified program sequence, the first macroinstruction 102 is followed by the second macroinstruction 104 which followed by the third macroinstruction 106. In some instances, less than three macroinstructions may be available within the instruction buffer. In those instances, the first decoder receives the first available macroinstruction. If a second macroinstruction is available, the second decoder receives it, and then if a third macroinstruction is available, the third decoder receives it. Additional macroinstructions may be stored in the buffer, as is described elsewhere in more detail, and supplied to the decoders in subsequent cycles.

In the preferred implementation, no dependency checking is performed before the macroinstructions 102–106 is supplied to the parallel decoders, unlike other superscalar configurations which do not issue instructions in parallel if there are data dependencies between the instructions. Instruction scheduling is performed in units subsequent to the decoder.

The first macroinstruction 102 is supplied to a first decoder 110 that will be described in more detail subsequently. Briefly, the first decoder 110 is a "full" decoder that has the capability of decoding any macroinstruction within the instruction set defined for the microprocessor. The first decoder 110 includes circuitry to decode the first macroinstruction 102 into one or more micro-operations. As will be discussed subsequently in more detail, decoding of the first macroinstruction 102 proceeds several stages. First, the macroinstruction is decoded by an XLAT PLA to generate control micro-operations ("Cuops"). These Cuops are subsequently combined with extracted fields and immediate fields to supply Auops, which are illustrated at 112. The capital letter "A" represents "aliasing is resolved" (i.e., complete), and "uop" represents a micro-operation. Therefore, the first decoder 110 outputs Auops 112 in which indirect references have been resolved. The mechanism for aliasing will be described in more detail subsequently.

The second macroinstruction 104 is supplied to a second decoder 120, and the third micro-operation 106 is supplied to a third decoder 130. Briefly, the second decoder 120 and the third decoder 130 are "partial" decoders that contain circuits to decode a subset of all macroinstructions 100 within the instruction set, thereby reducing complexity of the second decoder 120 and the third decoder 130, compared with the first decoder 110, which is a full decoder. In the preferred embodiment, the second decoder 120 and the third decoder 130 have an identical structure, which is described in detail subsequently. The second decoder 120 produces a second Auop 122, and the third decoder 130 produces a third Auop 132.

The first Auops 112 from the first decoder 110, the second Auop 122 from the second decoder 120, and the third Auop 132 from the third decoder 130 are supplied to an output queue 140, which may be constructed in any conventional form. One embodiment for the output queue 140 is described in a copending, commonly assigned patent application entitled "An Output Queue for Multiple Operations Received Simultaneously from a Parallel Decoder", by Brown et al., Ser. No. 08/204,597, filed of even date herewith, which is incorporated by reference herein.

From the output queue 140, micro-operations 112, 122, and 132 are issued to other units for scheduling and eventual execution when those units are ready to receive the issued micro-operations 112, 122, 132. Auops are written into the output queue 140 independent of micro-operation reads from the queue 140. A micro-operation issued from the output queue 140 may be referred to as a "Duop", a term that represents a "decoder-issued Uop". A Duop may have a form identical with an Auop; however additional information may be included in a Duop such as a macro-branch target or a fall through address. Because the number of micro-operations varies widely from cycle to cycle, the output queue 140 holds a plurality of Auops, and issues multiple Duops when requested by subsequent units. In the preferred embodiment, the output queue 140 holds six micro-operations and can issue up to three micro-operations in parallel. The output queue 140 helps smooth the flow of micro-operations to subsequent units. Although not required for practicing the multiple instruction decoder described herein, the output queue 140 supplies the micro-operations to processing units that have a high execution rate. In some embodiments, these processing units include circuits that perform superscalar processing and/or out-of-order processing.

Discussion of Partial Decoder 200

Reference is now made to FIG. 2, which is a block diagram of a partial decoder 200 which, in the preferred embodiment, is implemented within the second decoder 120 and the third decoder 130. A macroinstruction 202, when supplied to the partial decoder 200, may or may not be decodable by the partial decoder 200. In order to make this determination, opcodes from the macroinstruction 202, which specify the operation to be performed by the macroinstruction, are provided to fast detection logic 210, which quickly analyzes them, and determines whether or not the partial decoder 200 can decode the macroinstruction 202. The fast detection logic 210 outputs a DECALL ("Decodable By All") signal dependent upon the results of this determination. The DECALL signal may be supplied to other units, including a steering unit that controls steering the macroinstructions 100 (FIG. 1). If the macroinstruction 202 is not decodable, it may be supplied in a subsequent clock to another decoder, for example the first decoder 110, which is a full decoder. In other words, if the macroinstruction 202 is nondecodable, it will be resteered to the next lowest available decoder during subsequent clocks until finally it reaches a decoder that can decode it. The full decoder, that can decode all macroinstructions in the instruction set, is the first decoder 110. Therefore, a macroinstruction 202 may be steered to the third decoder 130, and if not decodable therein, it can be re-steered to the second decoder 120 or to the first decoder 110.

The partial decoder 200, as well as the full decoder 500 to be described, include an aliasing system. An exemplary aliasing system is described, for example, in U.S. Pat. No. 5,222,244, issued to Carbine et al. on Jun. 22, 1993.

The DECALL signal together with all opcodes are provided to a translate (XLAT) PLA 220 within the partial decoder 200. "PLA" is an acronym for "Programmable Logic Array", which is a programmable circuit commonly used for decoders. The PLAs could be implemented as combinational logic, static or dynamic. In the preferred embodiment, the XLAT PLA 220 is implemented as static combinational logic. Within the XLAT PLA 220, the opcodes are decoded into a control micro-operation, termed a "Cuop" illustrated at 222. As implemented, a Cuop includes a template for a particular micro-operation and control information that defines aliasing (indirect data access) required by that Cuop. It may be noted that in the INTEL instruction set the number of opcodes bytes may be one, two, or three (the third byte is actually the mod r/m byte, which is considered by some to be an opcode byte). Predetermined bits from these three bytes are always supplied to the XLAT PLA 220. If during decoding some of the supplied bits are not necessary to decode the current instruction, then they are ignored. For example if only the first byte is an opcode byte, then the second and third bytes are ignored or considered "don't cares" by the XLAT PLA 220. The XLAT PLA 220 is also supplied with decoded prefix information. For example, the XLAT PLA 220 may be supplied with repeat prefix information, a lock indicator, and an operand size prefix.

The Cuop 222 is supplied to a Cuop register 224, in which it is latched by a latch clock signal. The Cuop 222 includes control fields 226 and a template 228, which are also illustrated in FIG. 3 and described subsequently with reference thereto. In the described embodiment of the partial decoder 200, the XLAT PLA 220 includes circuitry to produce one Cuop 222 per macroinstruction. Because there is only one XLAT PLA 220, the partial decoder 200 can decode only those macroinstructions 202 that can be decoded into one Cuop 222. However, in other embodiments, and particularly if more die space is available, second and additional XLAT PLAs (not shown) could be provided to include circuitry to produce additional Cuops, so that two or more Cuops could be supplied in parallel.

Reference is now made to FIG. 3, which illustrates the fields defined by the Cuop 222 within the Cuop register 224. All Cuop data is stored in the Cuop register 224. The Cuop within the register 224 will not be issued unless a valid bit 310 is asserted.

The valid bit 310 is a 1-bit field that indicates whether or not the Cuop to which it is attached is valid. The valid bit 310 is particularly useful for a full decoder 500 to be described, which includes multiple XLAT PLAs each producing a Cuop, and a microcode sequencing unit. Specifically, the valid bit 310 is useful for determining whether a particular Cuop is valid before forming an Auop.

The control field 226 within each Cuop is useful for indirect access to other registers using an alias mechanism such as that to be described. The control field 226 may include opcode alias bits, which signify whether the opcode is aliased. For example, the opcode alias bits may tell whether or not to substitute bits from alias registers or from other places. Furthermore, they may indicate whether or not the opcode fields need to be decoded to determine whether certain bits can be replaced. One advantage of including control fields within each Cuop 224 is flexibility. This provides a substantial advantage because, by use of alias registers, and aliased Cuops, the number of minterms (i.e., entries) in the XLAT PLAs can be reduced substantially. For example, in the preferred INTEL implementation one group of instructions includes the following operations: ADD, XOR, SUB, AND, and OR, which are implemented with one generic Cuop. Another group of instructions representable by only one Cuop includes ADC and SBB. The use of aliasing within the Cuops allows a single Cuop to be used for each group of operations. An example of how a generic opcode can be utilized follows. Three bits, termed "TTT bits", are included within the first byte of certain opcodes. These bits are well known opcode bits of certain operations, and are shown in the i486™ *Programmers Reference Manual*, 1992, pages E-4 through E-6. The TTT bits are extracted by the field extractor (to be described) and included within the macro-alias data. A generic Cuop is formed without the TTT bits and then merged with the TTT bits from the macro-alias data within the alias multiplexers to form a unique Auop.

The Cuop register 224 also includes the opcode field 330, and register fields including a SRC1 field 340, a SRC2 field 342, and a DEST field 344. These fields specify the particular logical register to be utilized either directly or indirectly. This information can be affected by control information and the control fields for the alias multiplexers. The SRC1 field, the SRC2 field, and the DEST field can be utilized directly or alternately they may be aliased to indirectly specify a particular macro-alias register.

The Cuop register 224 also includes an immediate field 350. In some instances, the immediate field 350 can specify one of the 32-bit alias registers, to be described. In other instances, the immediate field 350 can be used to address a constant stored in a ROM that stores commonly used constants. For example, the immediate field 350 may include a representation of an integer constant 65520, which is stored in a constant ROM that is addressed by the immediate field 350.

In summary, the control aliasing information provided in each Cuop is useful for reducing decoder size, and improving performance while still providing the capability for decoding a large and complex instruction set.

Referring again to FIG. 2, the first eight bytes from the macroinstruction 202, beginning with the opcodes, are supplied to a field extractor 250. These eight bytes will be supplied regardless of the actual length of the instruction. If, as in a variable length instruction set, the actual number of bytes beginning with the opcodes is less than eight bytes, then the remaining bytes are still supplied to the field extractor 250, but they will not affect the microcode for that instruction. For example, if the length beginning with the opcodes to the end of the macroinstruction is five bytes, then the last three bytes of the eight supplied bytes may affect some of the fields of the macro-alias registers, but these fields will never be used. However, in the event that the length of the instruction beginning with the opcodes is greater than eight bytes, then this circumstance will be detected in the fast detection logic 210, and the instruction will not be decodable by the partial decoder 200.

The field extractor 250 includes circuits, which will be described subsequently in more detail, to extract fields such as register specifiers from the operands and steer them to alias registers. The field extractor 250 is responsible for extracting all aliasable information from the macroinstruction 202 in parallel with operation of the XLAT PLA 220. Preferably, the field extractor 250 could also include circuits that perform the following functions: detection of illegal operand usage, decoding of prefix bytes (if not previously decoded), and calculation of actual macroinstruction length for subsequent use. However, in one implementation, these functions are performed in the instruction steering logic.

The field extractor 250 receives, in addition to the opcodes and operands from the macroinstruction 202, control information 254 indicative of the mode of operation and how data is to be interpreted, such as a D-bit, which indicates whether data is interpreted to be 32-bit or 16-bit, and the B-bit, which indicates stack size. Furthermore, the field extractor 250 may also receive a prefix vector 256 which includes decoded prefix information that can affect interpretation of the opcodes and operands. The INTEL instruction set allows use of prefixes, which are bytes of information that may be prepended to a macroinstruction. One difficulty with the prefixes in the INTEL instruction set is that any arbitrary instruction may or may not have a prefix, and if present, the number of prefix bytes can vary from one to fourteen. Generally, prefixes can affect the instruction code following it, particularly the interpretation of a macroinstruction 202 and the operands within it. Prefix decode logic, which will be described with reference to FIG. 6, decodes each byte in the instruction buffer to supply prefix vectors. For some purposes, the prefix decoding circuit could be considered to be an element of the field extractor 250; however, for purposes of the present description, the prefix decoding circuit will be described separately. Briefly, the prefix decoding circuit decodes the prefixes to provide the prefix vector 256 having decoded bits easily usable by the field extractor 250 and the XLAT PLA 220.

The aliasable information, termed macro-alias data illustrated at 258, is stored in macro-alias registers 260. A latch clock signal is provided to latch the information therein for later use. It may be noted that the total data width of the operands and opcodes input into the field extractor 250 is sixty-four bits (8×8) for the partial decoder 200, but a large number of bits (about 130) of macro-alias data 258 are provided to the macro-alias registers 260. Therefore, it should be apparent that one macroinstruction 202 will not contain every alias field that can be extracted from the field extractor 250.

Reference is now made to FIG. 4, which is a block diagram of the field extractor 250 and the macro-alias registers 260, particularly illustrating fields within the macro-alias registers 260. The width of each register within the macro-alias registers 260 is dependent upon the maximum allowable size of the data stored within that register. For example, if the maximum size of source data is N-bits, then the size of the source register will be N-bits. Displacement data to be stored in another register may have a maximum size of 32-bits, and therefore the displacement register will have that size.

As discussed above, all aliasable information is latched into alias registers 260. Each field within the alias registers 260 falls into one of two general categories: bits extracted from the macroinstruction stream; or encoded fields that are a result of extracted data, architectural machine state, or some combination of the two. Examples of alias fields include logical registers, address size, data size, stack address and stack data size, immediate and displacement data, branch information, and portions of various predetermined opcodes.

The macro-alias registers 260 include fields such as a register segment field 270, a register base field 272, a register index field 274, an immediate data register 276, a displacement data register 278, a stack address size field 280, a data size field 284 which indicates the size of the data as well as some floating point information, and an address size field 286 that indicates whether the data address is 16- or 32-bits.

Reference is again made to FIG. 2. The macro-alias fields from the macro-alias registers 260 are provided to alias multiplexers 280, in which they are selectively combined with the Cuop 222 in order to assemble a complete Auop 290 in accordance with a predetermined aliasing system. Specifically, control fields that are included in the Cuop register 224 select macro-alias fields from the macro-alias registers 260, and combine them with a Cuop template from the Cuop register 224. The alias multiplexers 280 include conventional circuitry, including a plurality of multiplexers responsive to the control fields 226, that select particular fields and combine them with the template 228 from the Cuop register 224 in order to provide a complete Auop 290.

Discussion of Full Decoder 500

Reference is now made to FIG. 5, which is a circuit and block diagram of a full decoder 500 that can decode all macroinstructions. In comparison, the partial decoder 200 (FIG. 2) can decode only a subset of the macroinstructions. In the preferred embodiment, the full decoder 500 implements the first decoder 110 shown in FIG. 1.

A macroinstruction 502 having a format of the INTEL instruction set is provided to the full decoder 500, in a manner discussed with reference to FIG. 1. Therefore, the macroinstruction 502 includes one or more opcode bytes illustrated at 504, and also may include one or more operands and other bytes following the opcodes. As discussed also with reference to FIG. 2, three bytes, beginning at the first opcode byte are supplied regardless of the actual number of opcode bytes, which may be one, two, or three. If additional bytes are included, for example if only the first byte is an opcode byte, then the second and third bytes may be ignored by the XLAT PLAs 510–516 and the entry point PLA 530.

The opcode bytes 504 are supplied to a first XLAT PLA 510, a second XLAT PLA 512, a third XLAT PLA 514, and a fourth XLAT PLA 516 that operate in parallel to supply up to four Cuops simultaneously from a single macroinstruction. Each XLAT PLA 510–516 receives the opcode bytes from the macroinstruction 502, as well as some prefix information, such as that described with reference to the partial decoder 200. The prefix information, supplied by the prefix decoder to be described subsequently in detail, is sometimes needed to interpret the opcode bytes. Each XLAT PLA 510–516 includes conventional circuitry to receive the opcodes 504 and responsive thereto to output a Cuop having the format described with reference to FIG. 3, including control fields and a template. In other words, the first XLAT PLA 510 includes circuitry to decode the opcode bytes into a first Cuop, the second XLAT PLA 512 includes circuitry to decode the opcode bytes into a second Cuop, the third XLAT PLA 514 includes circuitry to decode the opcode bytes into a third Cuop, and the fourth XLAT PLA 516 includes circuitry to decode the opcode bytes into a fourth Cuop. Thus, the XLAT PLAs 510–516 decode the opcode bytes of a macroinstruction 502 to supply up to four Cuops in parallel.

The full decoder 500 can decode macroinstructions into one, two, three, or four Cuops. In one embodiment, the valid bit 310 (see FIG. 3) is asserted in each valid Cuop by the XLAT PLA that produced it in order to signify that that Cuop is valid (unless there is an outstanding request to load the macro-alias registers, to be described). If, however, the Cuop is not valid, then the valid bit 310 for that Cuop is not asserted. If the macroinstruction 502 requires decoding into only one Cuop, then a Cuop output will be supplied from one of the PLAs 510–516 and its valid bit 310 will be asserted and the valid bits from the other XLAT PLAs will not be asserted. If the macroinstruction 502 is decoded into two Cuops, then the first Cuop and the second Cuop are supplied from two of the XLAT PLAs 510–516 and their valid bits 310 will be asserted. If the macroinstruction 502 is decoded into three Cuops, then the first three Cuops are supplied from three of the XLAT PLAs 510–516 and their valid bits 310 will be asserted. And of course, if the macroinstruction 502 is decoded into four Cuops, then the four XLAT PLAs 510–516 supply the four Cuops in parallel, each having its valid bit 310 asserted.

In order to handle the situation in which the macroinstruction 502 is to be decoded into multiple Cuops that are not all supplied from the XLAT PLAs 510–516, the full decoder 500 includes circuitry for accessing microcode, including an entry point PLA 530 and a microcode sequencing ("MS") unit 534 coupled thereto that includes control circuitry to perform the following described functions. The opcodes from the macroinstruction 502 are supplied to the entry point PLA 530 that decodes the opcodes to generate an entry point address into microcode ROM. The generated entry point address is supplied to the MS unit 534 that, responsive to the entry point, generates a series of Cuops. The MS unit 534 includes a microcode ROM ("UROM") that includes microcode routines to supply UROM Cuops for long instructions flows, which in some examples may require over a hundred UROM Cuops. The UROM also includes assist handling routines and other microcode.

The MS unit 534 is capable of generating multiple UROM Cuops in any one cycle, responsive to the entry point generated in the entry point PLA 530. As implemented, the MS unit 534 generates up to three UROM Cuops per cycle. The UROM Cuops have a format similar to that of the Cuops generated in the XLAT PLAs 510; particularly, the UROM Cuops include control fields and a template.

The UROM Cuops are generated by microcode within the MS unit 534. The microcode can, in some instances, generate particular signals such as LOADMAR, LOADUAR, and other signals which will be discussed subsequently in more detail.

As implemented, the MS unit 534 allows branching operations, which are termed "micro-branches". In the event of a branch misprediction, which will be determined by subsequent units such as the execution units, the decoder state may need to be recovered before microcode at the actual target address can be executed. Micro-branch misprediction is discussed in more detail with reference to FIG. 13.

A Cuop multiplexer unit 540 includes a plurality of 2:1 multiplexers that select between a Cuop from the XLAT PLAs 510–516, and UROM Cuops from the MS unit 534. Specifically, the first 2:1 multiplexer selects between a Cuop from one of the first XLAT PLA 510 and the MS unit 534. The second 2:1 multiplexer selects between a Cuop from the second XLAT PLA 512 and the MS unit 534, and the third 2:1 multiplexer selects between the third XLAT PLA 514 and the MS unit 534. Control for the plurality of 2:1 multiplexers 540 is supplied from the MS unit 534 via a MSBusy signal. The MS unit 534 includes control logic, responsive to a valid entry point, to generate a MSBusy signal that controls a multiplexer unit that selects between the Cuops from the XLAT PLAs 510–516 and UROM Cuops. When the MS unit 534 wants to begin inserting UROM Cuops, it asserts the MSBusy signal to switch the multiplexers 540, and maintains it as long as microcode control is required. In other words, when the MS unit 534 begins supplying UROM Cuops, it asserts the MSBusy signal in order to direct the multiplexers 540 to select the UROM Cuops instead of the Cuops from the XLAT PLAs 510–516.

In the preferred embodiment, some of the more frequently-used macroinstructions are decoded by the XLAT PLAs 510–516 into one, two, three, or four of the first Cuops in the micro-operation sequence, which provides high performance at the cost of additional minterms in the XLAT PLAs 510–516. Alternately, for some less frequently-used macroinstructions, the four XLAT PLAs 510–516 issue no Cuops, but simply allow the MS unit 534 to issue all Cuops. This second alternative has a disadvantage of lower performance (i.e., a loss of at least one clock cycle), but can save minterms (entries) in the XLAT PLAs 510–516, which is a design trade-off that reduces die space at the expense of lower performance. This trade-off can be useful for less frequently used instructions or for long microcode flows where the significance of one additional clock is lessened.

The Cuop from each of the 2:1 multiplexers 540 is latched into a Cuop register unit 550 that includes a plurality of Cuop registers. Specifically, a first Cuop register receives a first Cuop from the first 2:1 multiplexer, a second Cuop register receives a second Cuop from the second 2:1 multiplexer, a third Cuop register receives a third Cuop from the third 2:1 multiplexer, and a fourth Cuop register receives a Cuop directly from the fourth XLAT PLA 516. The Cuops are latched into the Cuop register unit 550 by a latch clock signal that is supplied by conventional control means. The contents of each Cuop register include the fields described previously with reference to FIG. 3. Specifically, each Cuop includes a valid bit 310, control fields 226, and template fields 228. Only if its valid bit 310 is set will a Cuop be used to form an Auop that is issued into the output queue.

The contents of the four Cuop registers 550 are supplied to a 4:1 micro-alias multiplexer 560 that selects one of said Cuops, which is supplied to micro-alias registers 562 and stored therein. The information in the micro-alias registers 562 is utilized to hold information extracted from one of the four Cuops for use by a Cuop subsequently issued by the MS unit 534. The micro-alias register 562 includes three fields: an 8-bit SRC1 field, an 8-bit SRC2 field, and an 8-bit DEST field extracted from the selected Cuop.

Control for the micro-alias register 562 is supplied from the MS unit 534. Particularly, the MS unit 534 supplies a LOADUAR ("Load Micro-Alias Register") signal that loads the micro-alias register 562, and a UARUIP ("Micro-Alias Register Micro-Instruction Pointer") signal that includes two bits to select one of the four Cuops from which to store information. The Cuop field stored in the micro-alias registers 562 can be from either the XLAT PLAs 510–516, or from the MS unit 534. The MS unit 534 supplies a UIPinUROM signal that indicates whether the Cuop is to be loaded from the XLAT PLAs 510–516, or from the MS unit 534.

The micro-alias registers 562 are particularly useful in long instruction flows, which allows the microcode programmer flexibility in retaining information and simplifying code. For example, the microcode may include a rounding routine that is generically used in many different microcode sequences to round a number. Because the number to be rounded will likely be stored by a microcode instruction not within the rounding routine, the rounding sequence itself would not know directly where the information was stored. Therefore, the preceding microcode stores the address of this number (i.e., the register in which it is stored) in the micro-alias registers 562, and then the rounding routine is run, using the contents of the micro-alias register 562 to specify the register address of a number to be rounded. Thus, by storing the address of the register in which the data is stored, a common generic microcode routine can be utilized by any of a number of other microcode programs. Because the registers are not hard-coded into any routine, the programmer has great flexibility to access any register indirectly by accessing the register address within the micro-alias register 562. For example, in a microcode flow for a floating point routine such as sine or cosine, a temporary floating point value may be stored in a "scratch" register, whose address is stored in the micro-alias register 562. Then, the generic rounding routine may be called, which utilizes the address within the micro-alias register 562 to specify the value that is to be rounded for the floating point routine. Thus, one generic rounding routine that indirectly accesses the scratch register via the micro-alias registers 562 is provided, which has an advantage of substantially reducing the amount of microcode, thereby reducing cost and die space.

The micro-alias register 562 is provided within the full decoder 500, and not in the partial decoder 200, because only the full decoder 500 includes the microcode sequencing unit that is capable of decoding the complicated instructions which can utilize the micro-alias register 562. As an additional advantage, the micro-alias registers 562 can be aliased within themselves to provide two levels of indirection. For example, a Cuop may have its source aliased to use logical SRC1 in the micro-alias registers 562, while logical SRC1 in the micro-alias registers 562 is aliased to the contents of a macro-alias register 580, described subsequently. Therefore, the output Auop will receive the contents of its SRC1 field from the designated macro-alias register. In order to accomplish this, the micro-alias register also includes an alias bit for each field that indicates whether or not the micro-alias field is aliased to a macro-alias register. If not aliased, then the data within the micro-alias register can be used literally, but if it is aliased, then the data within the micro-alias register indirectly specifies one macro-alias field. To implement this, the alias bit can be used as a control input into the alias multiplexer.

Returning to the upper section of FIG. 5, the opcodes and operands from the macroinstruction 502 are supplied to a field extractor 570. Because the full decoder 500 can decode any of the macroinstructions in the instruction set, and the maximum length of a macroinstruction in the preferred instruction set is fifteen bytes, the field extractor 570 receives the entire eleven bytes that is the maximum size of the opcodes and operands of a macroinstruction. The field extractor 570 receives, in addition to opcodes and operands from the macroinstruction 502, control information 574 that, responsive to the mode of operation of the processor indicates how data is to be interpreted. An example of control information 574 is a D-bit, which indicates whether data is interpreted to be 32-bit or 16-bit, and the B-bit which indicates stack size. Furthermore, the field extractor 570 may also receive a prefix vector 576 that can affect interpretation of the opcodes and operands, if the instruction code allows prefixes that affect interpretation of the macroinstruction 502 and the operands within it. The prefix vector 576 is provided from a prefix decoding circuit described subsequently with reference to FIG. 6.

The output of the field extractor 570 includes macro-alias data 578 which is stored in macro-alias registers 580. The structure of the macro-alias registers 580 is identical to that described with reference to FIGS. 2 and 3.

Each decoder, whether it be the full decoder 500 or the partial decoder 200, includes a field extractor that is responsible for extracting all aliasable information from a macroinstruction in parallel with operation of the XLAT PLAs in that decoder. Particularly, the full decoder 500 includes only one field extractor 570 and one set of macro-alias registers 580, even though there are multiple (i.e., four) XLAT PLAs 510–516. By reference to FIG. 2, it may be noted that each partial decoder 200 also includes a field extractor and a set of macro-alias registers, although they may not be as large as in the full decoder 500 and may not be able to support the full range of operands. Thus, an advantage is provided because only a single field extractor is required for multiple XLAT PLAs, each of which can independently supply a Cuop. Thus, multiple Cuops can be supplied in parallel.

A plurality of alias multiplexers 590 are each coupled to the macro-alias registers 580, the micro-alias registers 562, and the Cuop registers 550. Specifically, a first alias multiplexer 592 is coupled to the first Cuop register, the micro-alias registers 562, and the macro-alias registers 580. The second alias multiplexer 594 is coupled to the second Cuop register, the micro-alias registers 562, and the macro-alias registers 580. The third alias multiplexer 596 is coupled to the third Cuop register, the micro-alias registers 562, and the macro-alias registers 580, and the fourth alias multiplexer 598 is coupled to the fourth Cuop register, the micro-alias registers 562, and the macro-alias registers 580.

Control for the four alias multiplexers is provided within the Cuops in the Cuop register 550. Within each of the alias multiplexers, the Cuop template from the Cuop coupled thereto is combined with selected data from the macro-alias registers 580 and/or micro-alias registers 562, as specified by control from Cuop coupled thereto. The output from the alias multiplexers 590 includes one or more Auops. Specifically, a first alias multiplexer 592 supplies a first Auop, a second alias multiplexer 594 supplies a second Auop, a third alias multiplexer 596 supplies a third Auop, and a fourth alias multiplexer 598 supplies a fourth Auop.

In the event that a micro-operation causes an error, there are some instances in which the error can be corrected by assist handling microcode within the MS unit 534. In those instances, the MS unit 534 is directed, by a fault or exception handler that has been notified of the error, to assist the instruction and, as necessary, to restart the instruction. Assist handling can only occur in the full decoder 500, because assist handling is directed by the MS unit 534 which only has access to macro-data in the full decoder 500. Further discussion of assists and restarts, and the state recovery necessary to perform them is described in more detail with reference to FIGS. 11, 12, 13, and 14.

Discussion of Prefix Decoding

Reference is now made to FIG. 6, which is a diagram of a prefix decoding circuit that supplies prefix information to both the full decoder 500 and the partial decoder 200. An unsteered macroinstruction is stored in an instruction buffer 600. As illustrated, the instruction buffer 600 includes sixteen contiguous bytes of instruction code, which have not been separated into individual macroinstructions, However, a plurality of byte marks 602 are provided by a predecoder, such as the instruction length decoder 814, discussed with reference to FIG. 8. The byte marks 602 can also be supplied by conventional means to designate the positions of the last byte of each instruction, and the first opcode byte of each instruction, thereby indicating a prefix by the number of bytes between the first operand byte and the last byte of the previous instruction. Additionally, steering control information is provided as illustrated at 604, which indicates which instruction is being provided to each of the decoders.

The byte marks 602 and the steering control information 604 are supplied to prefix control logic 610, in which the information is utilized to determine if a one-byte prefix is present and if so, to direct the decoded prefix information to the decoder that receives the associated opcodes. The prefix control logic 610 also includes circuitry to determine how many prefixes exist in each instruction. If only one prefix is present, or none, then all prefix decoding can be handled within the prefix decoding circuit to be described. However, if more than one prefix is associated with an instruction, then a conventional state machine (not shown) will consume one prefix each clock, until all prefixes have been decoded into a prefix vector. Of course, further decoding of the macroinstruction to which the multi-byte prefix is prepended will be stalled until the prefix vector becomes available after it has been fully decoded.

In the preferred embodiment, both the full decoder 500 and the partial decoder 200 can handle one prefix byte per macroinstruction without a clock cycle penalty. In the preferred configuration, prefixes are not considered a separate instruction, but are treated as another byte of the instruction to which they are prepended. The assumption of one prefix byte per macroinstruction is particularly advantageous if it turns out that instruction does have only one prefix byte.

As implemented, the partial decoder 200 can handle only one prefix byte per macroinstruction. The full decoder 500 can handle the rare instance of multiple prefix bytes. If an instruction were to be steered to a partial decoder 200 that has more than one prefix byte, then the steering mechanism will invalidate the decoding of that instruction and subsequent operations based on that instruction, and resteer it to the lowest available decoder during subsequent clocks, until it reaches a full decoder 500 that has the capability of decoding more than one prefix. It is possible, although unlikely, that an instruction has up to fourteen prefix bytes while still being a valid instruction. The prefix decoding circuit includes circuitry to detect the presence of two or more prefixes. In such an instance, a state machine takes over, and sequentially decodes each prefix, one prefix byte at a time, until the entire prefix is decoded. In comparison, the Pentium ™ processor treats prefixes as separate instructions, and decodes all in a serial fashion, one per clock, including instances where only one prefix is present.

Each byte from the unsteered instruction buffer 600 is coupled to a prefix decoder 620. Specifically, a first byte is supplied to a first prefix decoder 620a, a second byte is supplied in parallel to a second prefix decoder 620b, and so forth for each byte up to and including a sixteenth byte which is supplied in parallel to a sixteenth prefix decoder 620p. Within each prefix decoder 620a–p, a byte is decoded as if it were the first and only prefix of an instruction. Specifically, a first prefix decoder 620a supplies a first prefix vector as illustrated at 622a, the second prefix decoder 620b provides a second prefix vector as illustrated at 622b, and so forth, up to and including the sixteenth prefix decoder 620p which supplies a sixteenth prefix vector 622p. Parallel decoding of all prefix bytes advantageously ensures the availability of a prefix vector if the assumption of one prefix turns out to be true. In the preferred embodiment, fifteen, rather than sixteen prefix decoders 620a–p are implemented. There is little advantage in decoding the sixteenth byte because, if it is a prefix byte, the remainder of the instruction is not available in the 16-byte instruction buffer 600.

Each prefix vector 622a–p includes bits indicating the presence of certain prefix types and is directly usable to indicate the existence of certain prefix bytes. For example, one bit position in the prefix vector may indicate whether the address size is 16- or 32-bits, and another bit position may indicate whether the operand size is 16- or 32-bits. However, some of the bits may not be completely decoded. Which of the bits are fully decoded, and which are partially decoded, is determined by the needs of the circuitry receiving the prefix vector.

Each of the prefix vectors 622a–p, illustrated collectively at 630, are supplied to multiplexers that are coupled to the decoders. Particularly, the prefix vector 630 is coupled to a first 16:1 multiplexer 640 that is coupled to supply a first selected prefix vector illustrated as 642 to the first decoder 110 (FIG. 1). The prefix vectors 630 are also coupled to a second 16:1 multiplexer 650 that is coupled to supply a second selected prefix vector 652 to a second decoder 120. The prefix vectors 630 are also coupled to a third 16:1 multiplexer 660, which supplies a third selected prefix vector illustrated at 662 to the third decoder 130.

The prefix logic 610 is coupled to supply control information for the multiplexers 640, 650, and 660. Particularly, in accordance with the byte marks that are being supplied to each of the decoders, and dependent upon the existence of a single prefix byte, a prefix vector will be selected and supplied to the decoder receiving the opcodes associated with that prefix byte. As discussed previously, the selected prefix vectors 642, 652, and 662 are supplied to a field extractor 250 for a partial decoder 200 and a field extractor 570 for a full decoder 500.

Instruction Decoding

FIG. 7 is a flowchart that illustrates operations to decode macroinstructions into Auops. Beginning in a box 700, a block of instruction code including variable length macroinstructions is loaded into the instruction buffer 600. From the box 700, operation moves in parallel to a box 710, in which macroinstructions are steered to each of the decoders, including, for example the first decoder 110, the second decoder 120, and the third decoder 130. In the box 710, opcodes are steered to the XLAT PLAs in each decoder, and opcodes and following bytes including operands are steered to the field extractor in each decoder. It should be apparent that a separate macroinstruction is steered to each decoder. Steering is performed by steering circuitry 101, to be described in detail with reference to FIGS. 8, 9, 10A, 10B, and 10C.

In parallel with steering as illustrated in the box 710, operation moves to a box 720, in which each byte is decoded as if it were a prefix. Subsequently, a decoded prefix vector may be selected and steered, as illustrated in a box 724, to each field extractor. As discussed previously, there is one field extractor for each decoder. An advantage of the system illustrated in FIG. 7 is that prefix decoding in the box 720 and the steering in the box 724 can be performed in the same clock cycle as steering to the decoders illustrated in a box 710. Therefore, if there is no more than one prefix byte, then the prefix can be decoded into a prefix vector without a clock penalty. In other words, the time required for prefix decoding is hidden behind the steering operations in the box 710.

From the box 710, operation moves in parallel to the boxes 730 and 740. In the box 730, the opcodes are supplied to the XLAT PLAs in their respective decoders in which the macroinstructions are translated into a plurality of Cuops. Subsequently, operation moves to a box 734 in which the Cuops are stored in Cuop registers. In the box 740, the opcodes and following bytes including operands from the box 710 and the selected prefix vectors from the box 724 are supplied to field extractors. The selected prefix vectors are associated with opcodes and the following bytes of the corresponding macroinstructions, to extract alias data from each macroinstruction. Subsequently, as illustrated in a box 744, macro-alias data is stored in the macro-alias registers.

From the boxes 734 and 744, the Cuops are combined with information in the macro-alias registers and/or micro-alias registers, as illustrated in a box 750, to create Auops. Subsequently, as illustrated in a box 760, the Auops from the box 750 are written into the output queue 140.

Instruction Steering

Reference is now made to FIG. 8, which is a block diagram of circuitry for retrieving macroinstructions and steering them to each of the three decoders. Subsequently, with reference to the flow charts of FIGS. 9, 10A, 10B, and 10C, operation of the circuitry shown in FIG. 8 will be described in more detail.

A memory 800, which may comprise any conventional computer memory element, is provided to store instructions. The memory 800 is coupled to an instruction cache 804 that stores instructions in a plurality of cache lines, in accordance with any conventional cache storage routine. The cache 804 and the memory 800 are coupled to an instruction fetch unit ("IFU") that includes an instruction length decoder 814, referred to as an "ILD" or a "predecoder". The ILD 814 examines each block of instruction code supplied to it, and determines the first opcode byte and the last byte of each macroinstruction within the block. The ILD 814 supplies a first opcode vector in which each bit indicates whether or not its associated byte is a first opcode byte. The ILD 814 also supplies a last byte vector in which each bit indicates whether or not its associated byte is the last byte of a macroinstruction.

An instruction pointer 820 is coupled to the instruction fetch unit 810, in order to provide an address in the memory 800 in which the instruction is to be fetched. Each instruction is normally fetched from the cache 804 in units of cache lines, which in the preferred embodiment, is in 16 bytes of code. After it is fetched, each cache line is applied to the ILD 814, which analyzes the code, and creates byte mark vectors that define each byte in the cache line. Specifically, the first opcode byte of each instruction is marked in a first opcode byte mark vector, and the last byte of a macroinstruction is marked in a last byte mark vector.

The instructions from the cache 804 and associated vectors are stored in a buffer 824 within the IFU 810, aligned with cache lines. It may be appreciated that each cache line may not be aligned with an instruction. For example, the first byte of a cache line may correspond to a middle byte of an instruction. In other words, the position of the macroinstructions within a cache line is arbitrary. From the buffer 824, the 32-bytes of code and byte mark vectors are applied to a rotator 830. The rotator 830 includes circuitry for selecting a 16-byte window from the 32-bytes in the buffer 824. As will be described, the 16-byte window is selected so that its first byte lies on an instruction boundary, which is defined as the location between adjoining macroinstructions in the instruction code.

The rotator 830 and associated circuitry is described in more detail in a commonly assigned, copending application entitled "Dual Instruction Buffers with a Bypass Bus and Rotator for a Decoder of Multiple Instructions of Variable Length" by Gupta et al., filed of even date herewith.

The 16-byte window from the rotator 830 is applied to an instruction buffer 840. The instruction buffer 840 is coupled to supply the byte mark vectors to a steering control unit 844 that includes circuitry to be described in more detail particularly with reference to the flow charts of FIGS. 9, 10A, 10B, and 10C.

The instruction buffer 840 is also coupled to a steering circuit 848 that selects blocks of instruction bytes therefrom. The steering circuit 848 includes circuitry to receive control instructions from the steering control unit 844, and in response thereto, to select bytes from the instruction buffer 840 and supply them to the decoders. Particularly, the steering circuit 848 selects eleven bytes and applies them to the first decoder 110, it selects eight bytes and supplies them to the second decoder 120, and takes a third eight bytes and supplies it to the third decoder 130. In this embodiment, the number of bytes is predetermined for each of the decoders 110, 120, and 130. The eleven bytes received by the first decoder 110 is equal to the maximum number of bytes (less prefixes) in any macroinstruction. If, as may often be the case, the actual length of the instruction is less than eleven bytes, then the instruction bytes following the end of the macroinstruction are simply ignored in the decoder 110. The second decoder 120 receives eight bytes, which is the maximum size of an instruction that can be decoded within the second decoder 120. Similarly, the third decoder 130 receives eight bytes, which is the maximum size of an instruction that can be decoded by the third decoder. If the length of any instruction is less than the full amount received by a decoder, then the additional instruction bytes are ignored.

Reference is now made to FIG. 9, which is a flow chart illustrating operations to align a 16-byte block of instruction code from a 32-bit unaligned byte, so that the 16-byte instruction block within the instruction buffer 840 is aligned on an instruction boundary. Particularly, the buffer 840 is aligned on an instruction boundary when the first byte of the buffer 840 includes the first byte of a macroinstruction, which may be either a prefix byte or an opcode byte. The procedure starts beginning in a block 900. To start, an assumption is made that the instruction buffer has 16-bytes of instruction code stored therein and associated byte mark vectors, including the last byte mark vector and the first opcode byte mark vector previously described. It is also assumed that the first byte of the instruction buffer 840 is aligned with an instruction.

From the start block 900, operation proceeds in parallel along two paths. In the first path, beginning with a block 910, the last byte mark vector is scanned backwards to locate the end of the last complete instruction in the buffer 840, which provides a time advantage over scanning from the front of the vector. Therefore, as indicated in a block 912, the first byte of the next instruction required to be stored within the instruction buffer 840 is known. Next, operation moves to a box 914 in which the first byte address is transmitted to the IFU 810 to request the next sixteen bytes beginning at that address. Subsequently, operation moves to the block 916 in which the IFU 810 begins operations to fetch instruction code including the next 16 bytes indicated by the known first byte. These 16 bytes must all be available within the 32-byte buffer 824. Finally, as indicated in a block 918, the next 16 bytes are available within that 32-byte buffer 824.

In the second path from the start box 900, operation begins in a box 930 in which the entire 16-byte instruction buffer 840 is applied to the prefix decoder described in detail with reference to FIG. 6, to supply prefix vectors therefrom. In parallel, operation moves to the box 934 in which the procedure for steering instructions is performed, which will be described in more detail with reference to FIGS. 10A, 10B, and 10C. The prefix vectors from the box 930 are utilized by the steering and decoding procedure in the box 934. Exiting from the box 934, operation moves to the box 938 which indicates that all complete instructions in the instruction buffer 840 have been consumed; i.e., all complete instructions within the instruction buffer 840 have been decoded.

A decision box 950 follows operations in the box 938 and the box 918. If both operations are complete, then operation moves to the box 954 in which the instruction buffer 840 is loaded with the next 16 bytes of instruction code and byte marks. Because the requested information loaded into the instruction buffer 840 is aligned with the first byte mark (as required by operations beginning in the block 912), the instruction block within the instruction buffer 840 is now aligned with the first macroinstruction.

Reference is now made to FIGS. 10A and 10B, and 10C which together are a flow chart illustrating the procedure for steering instructions to the decoder.

Beginning with a start block 1000, the procedure for steering instructions begins. Operation moves to a block 1010, in which the first opcode byte marks are scanned to locate the first opcode byte of a first instruction. In parallel, operation moves to block 1012 in which the first opcode byte marks are scanned to locate the first opcode byte of a second instruction. Also in parallel, operation moves to a block 1014 in which the first opcode byte marks are scanned to locate the first opcode byte of a third instruction. Beginning at the first opcode byte from the block 1010, operation moves to block 1020 in which 11 bytes of instruction code are steered to the first decoder, beginning at the located first opcode byte. From the box 1012, 8 bytes of instruction code are steered to the second decoder, the 8 bytes beginning at the first opcode byte of the second instruction. Similarly, for the third decoder, the 8 bytes of instruction code beginning at the first opcode byte of the third instruction is steered to the third decoder 130, as illustrated in an operation 1024.

Simultaneously with steering the instruction code, the prefixes are decoded (see box 930 of FIG. 9 and FIG. 6). The appropriate prefix vector is associated with the first instruction, as illustrated in a box 1030. Subsequently, as illustrated in a block 1032, the associated prefix vector is supplied to the first decoder 110. Similarly, from the block 1012, operation moves to the box 1034 in which a prefix vector is associated with the second instruction, and in a box 1036 the prefix vector is supplied to the second decoder 120. Similarly, for the third decoder, from the box 1014 and a prefix vector is associated with a box 1038 with the third instruction, and then a box 1039 the prefix vector is supplied to the third decoder 130.

One feature of the steering mechanism described herein is the ability to resteer instructions, dependent upon what happens in subsequent operations. When the first instruction has been steered from the boxes 1020 and 1032 to the first decoder 110, then the decision defined in the decision box 1050 determines whether or not that first instruction is decodable in one decode cycle. Macroinstructions for which the first instruction are not decodable in one decode cycle include, for example, an instruction that requires an entry into microcode, which requires at least two clock cycles in which to perform its operations. Another example is an illegal opcode, which requires at least two cycles in which to respond. Therefore, if the first instruction is not decodable in one cycle, then operation moves from the decision 1050 to a block 1052 which indicates that instruction decoding in the second and third decoders is stopped and the instructions therein flushed to prevent micro-operations being issued therefrom. Subsequently, operations are performed to decode the first instruction in multiple decode cycles. The decoding operation proceeds as described in detail previously.

However, if from the box 1050, the first instruction is decodable in one cycle, then the second decoder 120 and third decoder 130 can provide useful micro-operations. In that instance, operation moves from the decision 1050 in parallel to a decision 1060 which queries whether the second instruction is decodable by the second decoder 120, and a decision 1062 which queries whether the third instruction is decodable by the third decoder 130. Furthermore, in parallel, the first instruction is decoded as illustrated in a box 1064. From the decision 1060, if the second instruction is not decodable, then operation moves to the operation box 1070. The operation box 1070 also is coupled to the box 1060. Therefore, to get to the box 1070, the first instruction must be decoded, and the second instruction is not decodable by the second decoder 120. Subsequently, operation moves to the box 1072 which illustrates that operation returns to box 1000 which is the start of the procedure. The operations therein are repeated to steer the former second instruction to the first decoder 110, the former third instruction is steered to the second decoder 120, and any subsequent undecoded instruction in the instruction buffer 840 is steered to the third decoder 130.

However, if from the decision box 1060, it is determined that the second instruction is decodable by the second decoder 120, then operation moves to a block 1080 which illustrates that the second instruction is decoded. From the box 1080, a usable micro-operation will be provided. From the decision 1062, if the third instruction is decodable by the third decoder 130, then operation moves to the box 1082 which illustrates that the third instruction is decoded. Therefore, from the boxes 1064, 1080, and 1082, operation moves to box 1086, which shows that the first, second and third instructions have been decoded.

However, if from the decision box 1062, the third instruction is not decodable by the third decoder, then operation moves to the box 1088, which illustrates that the first and second instructions have been decoded, but the third instruction is not decodable by the third decoder 130. Subsequently, operation moves to a box 1090, which shows that operations then return to the start of the procedure, to steer the third instruction to the first decoder 110. Any subsequent undecoded instructions in the instruction buffer 840 are then steered to the second decoder 120 and the third decoder 130.

If all instructions have been decoded (each have provided valuable Cuops), as illustrated in a box 1086, then operation moves to a decision 1092, which is useful for determining when additional instructions must be supplied to the instruction buffer 840. Particularly, the decision box 1092 asks whether all instructions in the instruction buffer 840 have been decoded. If not, then operation moves to a box 1094 in which operation returns to the start, and the steering operation is repeated for all undecoded instructions. However, if from the box 1092 all instructions have been decoded, then operation moves to the box 1096 which indicates that the steering procedure is stopped and is now complete. In other words, all complete instructions within the instruction buffer 840 have been consumed by the decoder and the next 16-byte block of instruction code can be loaded into the instruction buffer 840. Reference is again briefly made to FIG. 9, which shows that another 16-byte block of instruction code is loaded into the instruction buffer 840 when the steering procedure is complete.

Assist Handling

Reference is now made to FIG. 11 which is a flow chart illustrating assist handling including state recovery. The flow chart of FIG. 11 also illustrates decoder state recovery associated with macroinstruction restart. Beginning in a start block 1100, operation starts when an assist routine is called in microcode as a result of an error that has been recognized after execution of a micro-operation. This includes errors such as faults or exceptions. Next, as illustrated in blocks 1102, the assist routine begins executing. Execution includes issuing assist handling micro-operations from the MS unit.

Operation then moves to the box 1105. For some assist routines, recovery of decoder state will be necessary. For example, if the assist routine requires data from an error-causing macroinstruction, then state recovery begins by restoring macro-alias data to macro-alias registers and the first Cuops to the Cuop registers. This operation, termed "restore MAR", is discussed with reference to FIG. 12. Briefly, the effect of the restore MAR operation is to reload the macro-alias registers with fields extracted from the assisted macroinstruction so that it can be utilized by subsequent code in the assist handling routine or other code, such as restarted code, as will be described. For this purpose, the restore MAR operation is inserted into the assist handling routine at a location in which can be properly utilized. For example, if the assist handling routine does not require use of the macro-alias data until subsequent restart, then the restore MAR in the box 1105 can be delayed until the end of the assist handling routine. However, if the macro-alias data is needed by the assist handling routine, then the operations to restore MAR operation in the box 1105 will occur before such instructions, and possibly as early as the beginning of the assist handling routine (or not done at all, if not required by the assist).

Additional state recovery may also be necessary to restore the state of the micro-alias registers. For example, operations to recover decoder state may be required if a micro-operation subsequent to the restart target uses micro-alias data from previous micro-operations. If necessary for use by subsequent code, the restore UAR routine, illustrated in FIG. 14 and discussed with reference thereto, is called to restore the contents of micro-alias data for use by subsequent micro-operations.

After the macro-alias data and the micro-alias data has been restored, as necessary, in the box 1105, then control is transferred back to the MS unit as illustrated in a box 1106, to continue the assist handling routine and, in some instances, to restart, as will be described.

After the assist handling sequence has performed its operations, it may be advantageous to restart the assisted macroinstruction. Restart is then directed by the last step of the assist handling routine, which will then transfer control to the microcode beginning at the restart target.

The restart decision is illustrated in a box 1110. If no further restart is desired at the end of the assist handling sequence, then operation moves to the box 1112 which indicates that the assist handling routine is exited and therefore operations continue wherever indicated by the assist handling sequence.

If restart is desired from the decision box 1110, then operation moves to the box 1120 which illustrates that the decoder state has been recovered in the box 1105. However, if additional state recovery were to be required, then the appropriate operations, discussed above, could be performed.

The restart target can be at any micro-operation within the micro-operation flow, which may be one of the first several Cuops issued from the XLAT PLAs, or it may be the microcode within the MS unit 534. From the box 1120, after the state has been recovered, a decision box 1130 branches depending upon whether restart is desired at one of the Cuops in the Cuop register, or from the MS unit 534.

If restart is to begin at one of the Cuops supplied from the XLAT PLAs 510–516 in the Cuop registers, then operation moves to a box 1132 in which the MS unit 534 indicates the position of the first Cuop that will eventually be issued from the decoder. The decoder then asserts the valid bit for the target Cuop and subsequent Cuops in the Cuop register, which then allows these Cuops to be issued to restart the assisted macroinstruction.

If necessary, the MS unit 534 will supply subsequent micro-operations to continue the micro-operation flow. This method is particularly advantageous if, for example, the third and fourth Cuops will be executed during a restart, but the first and second Cuops will not. Therefore, the described method is useful for restarting at any Cuop in the flow from a macroinstruction.

If from the decision 1130, restart begins at one of the Cuops within the MS unit 534, then operation moves from the decision 1130 to the block 1140 in which Cuops are supplied from the MS unit 534 to restart the assisted macroinstruction.

Reference is now made to FIG. 12, which illustrates operations to restore the macro-alias data. The operation illustrated in FIG. 12 is termed "restore MAR". Operation begins in a box 1200 which indicates the start of the restore MAR operation to restore macro-alias data in the macro-alias registers, including restoring the first Cuops that can be generated in the XLAT PLAs.

Following start, operation moves to a box 1210 in which a signal is supplied from the MS unit 534 to fetch the designated macroinstruction. This signal may include a LOADMAR ("Load Macro-Alias Register") signal. In the event an assist is in process, the designated macroinstruction will be the macroinstruction that originated the micro-operation sequence for which the assist is required. If the restore MAR operation is occurring as a result of a mispredicted micro-branch, then the designated macroinstruction is the macroinstruction that supplied the micro-operation sequence in which the mispredicted branch occurred.

From the box 1210, operation moves to the box 1220 in which the designated macroinstruction is supplied to the decoder 500. In the preferred implementation, the decoder in which this operation can be performed is the full decoder 500, because it is the only decoder that is coupled to a microcode sequencing unit.

From the box 1220, operation moves in parallel to the box 1230 in which the opcodes from designated macroinstruction are decoded in the XLAT PLAs and then, as illustrated in a box 1232, the Cuops resulting therefrom are supplied to the Cuops register with their valid bit unasserted. If a valid bit is unasserted (i.e., marked "invalid"), the Cuops will not be issued into subsequent units.

From the box 1220, operation also moves to a box 1240 in which fields are extracted within the field extractor 570, and then, as illustrated in a box 1242 macro-alias data 578 is supplied to macro-alias register.

After the above operations have been completed, the restore MAR operation is complete as illustrated in a box 1250. As a result of the restore MAR operations, the macro-alias registers are restored, and the Cuops are also restored so that the initial Cuops from the XLAT PLAs are stored therein, but with their valid bits remaining unasserted (i.e., marked invalid).

Reference is now made to FIG. 13, which is a flow chart that illustrates operations to restore the micro-alias register. This operation is termed "restore UAR". The restore UAR operation begins in a box 300, which indicates that the micro-alias data is to be restored in a micro-alias register. This routine is particularly useful for writing generic assist or fix-up microcode routines. For example, a routine that fixes up an underflow or overflow error can load the micro-alias registers from the problematic Cuop and reference its sources and destination fields to repair the result. The restore UAR operation is useful to restore micro-alias data from any micro-operation that can then be referenced in generic routines that save microcode space.

From the operation 1300 to start the restore UAR routine, operation moves to the box 1310, in which microcode is retrieved that generated the micro-operation having the data to be stored in the micro-alias register. Subsequently, from the box 1320, the micro-operation is generated by the decoder but not issued therefrom. The micro-operation can be generated by microcode or it can be generated in the XLAT PLAs. In the latter case, the micro-operations are generated by the restore MAR operation discussed above. Then, operation moves to the box 1330 in which the micro-alias data from that micro-operation is saved into the micro-alias register. Then, the restore UAR operation is complete, and the micro-alias data is restored for use by subsequent micro-operations.

Reference is now made to FIG. 14 which illustrates operations to restart a micro-operation flow at an actual micro-branch target. The operations illustrated herein typically result from a mispredicted micro-branch. As defined herein, a micro-branch is a branch made by microcode.

Operation begins in a box 1400 in which an actual micro-branch target is known and restart is desired at that actual target. Operation then moves to the box 1410 which indicates that the control goes to the target address at the beginning of the target microcode flow.

Subsequent operations illustrated in boxes 1420 and 1430 restore the macro-alias registers, as described with reference to FIG. 12. If either macro-alias data or micro-alias data or both may be used by subsequent micro-operations, then the first instructions at the target microcode flow restore the state by restoring the macro-alias registers if necessary and by restoring the micro-alias registers if necessary for use by subsequent micro-operations.

From the box 1430, operation then moves to execute the subsequent microcode in the target flow and subsequent micro-operations, as illustrated in a box 1440. Typically, if micro-alis registers have been restored in the box 1430, then the subsequent micro-operations may utilize the micro-alias data to assemble a complete Auop.

What is claimed is:

1. A steering method for steering multiple macroinstructions from a block of instruction code in an instruction buffer to a multiple instruction decoder in a processor, said steering method comprising the steps of:

a) locating a first non-prefix opcode byte of a first variable length macroinstruction within said instruction buffer;

b) steering a first predetermined number of non-prefix bytes beginning with said first non-prefix opcode byte of said first macroinstruction from said instruction buffer to a first decoder, wherein said first predetermined number represents a maximum number of non-prefix bytes permitted in any macroinstruction;

c) locating a first non-prefix opcode byte of a second variable length macroinstruction within said instruction buffer; and d) steering a second predetermined number of non-prefix bytes beginning with said first non-prefix opcode byte of said second macroinstruction from said instruction buffer to a second decoder, wherein said first and second predetermined number of non-prefix bytes are steered to said first and second decoders, respectively, substantially simultaneously.

2. The steering method of claim 1 further comprising the steps of:

e) locating a first non-prefix opcode byte of a third variable length macroinstruction within said instruction buffer; and f) steering a third predetermined number of non-prefix bytes beginning with said first non-prefix opcode byte of said third macroinstruction from said instruction buffer to a third decoder, wherein said first, second, and third predetermined number of non-prefix bytes are steered to said first, second, and third decoders substantially simultaneously.

3. The steering method of claim 2 wherein said processor supplies a first opcode byte vector in which each bit corresponds to one byte in said instruction buffer so that each bit indicates whether its associated byte is the first non-prefix opcode byte of a macroinstruction, wherein:

said step a) includes scanning said first opcode byte vector to locate said first non-prefix opcode byte of said first macroinstruction;

said step c) includes scanning said first opcode byte vector to locate said first non-prefix opcode byte of said second macroinstruction; and said step e) includes scanning said first opcode byte vector to locate said first non-prefix opcode byte of said third macroinstruction.

4. The steering method of claim 1 further comprising the steps of:

e) if circuitry associated with said second decoder indicates that the bytes within said second decoder cannot be decoded therein, then, in a next cycle following steering in said step d), resteering said second macroinstruction to said first decoder, so that said first predetermined number of non-prefix bytes beginning with the first non-prefix opcode byte of said second macroinstruction are steered from said instruction buffer to said first decoder.

5. The steering method of claim 4 further comprising the steps of:

f) locating a first non-prefix opcode byte of a third macroinstruction within said instruction buffer; and g) if circuitry associated with said second decoder indicates that the bytes within said second decoder cannot be decoded therein, then in said next cycle, steering said second predetermined number of non-prefix bytes beginning with said first non-prefix opcode byte of said third macroinstruction from said instruction buffer to said second decoder.

6. The steering method of claim 5 wherein steps a through g are repeated until all complete macroinstructions in said instruction buffer have been accepted for decoding within said decoders.

7. The steering method of claim 1, wherein said second predetermined number is less than said first predetermined number.

8. A steering method for steering multiple macroinstructions to a multiple instruction decoder from a block of instruction code in an instruction buffer aligned so that a first non-prefix opcode byte of a first variable length macroinstruction is aligned with a first byte of said instruction buffer, said steering method comprising the steps of:

a) steering a first predetermined number of non-prefix bytes beginning with said first non-prefix opcode byte of said first macroinstruction from said instruction buffer to a first decoder in a first cycle, beginning at said first byte, wherein said first predetermined number represents a maximum number of non-prefix bytes permitted in any macroinstruction;

b) locating a first non-prefix opcode byte of a second variable length macroinstruction within said instruction buffer, and responsive thereto, steering a second predetermined number of non-prefix bytes beginning with said first non-prefix opcode byte of said second macroinstruction from said instruction buffer to a second decoder in said first cycle;

c) if a circuitry associated with said second decoder indicates that the bytes within said second decoder cannot be decoded therein then, in a next cycle, performing the steps of ci) resteering said second macroinstruction to said first decoder, so that, responsive to said first non-prefix opcode byte of said second macroinstruction, said first predetermined number of non-prefix bytes beginning with said first non-prefix opcode byte of said second macroinstruction are steered from said instruction buffer to said first decoder; and cii) locating a first non-prefix opcode byte of a next macroinstruction, if available within said instruction buffer, and responsive thereto, steering said second predetermined number of non-prefix bytes beginning with said first non-prefix opcode byte of said next macroinstruction from said instruction buffer to said second decoder, and otherwise continuing to step d); and d) if said circuitry indicates that the bytes within said second decoder can be decoded therein, then, in said next cycle performing the steps of di) locating a first non-prefix opcode byte of a next macroinstruction within said instruction buffer, and responsive thereto, steering said first predetermined number of non-prefix bytes beginning with said first non-prefix opcode byte of said next macroinstruction from said instruction buffer to said first decoder, and dii) locating a first non-prefix opcode byte of a subsequent macroinstruction within said instruction buffer, and responsive thereto, steering said second predetermined number of non-prefix bytes beginning with said first non-prefix opcode byte of said subsequent macroinstruction from said instruction buffer to said second decoder.

9. The steering method of claim 8 further comprising the steps of:

e) in said subsequent cycles, repeating said steps c and d until all complete macroinstructions within said instruction buffer have been decoded.

10. The steering method of claim 8 wherein said second predetermined number is less than said first predetermined number.

11. The steering method of claim 8 further comprising the steps of:

e) in said first cycle before step c), locating a first non-prefix opcode byte of a third variable length macroinstruction within said instruction buffer and responsive thereto steering a third predetermined number of non-prefix bytes beginning with said first non-prefix opcode byte of said third macroinstruction from said instruction buffer to a third decoder.

12. A steering circuit for steering multiple macroinstructions from a block of instruction code in an instruction buffer to a multiple instruction decoder, said steering circuit comprising:

a) a scanning circuit for scanning said instruction buffer to locate a first non-prefix opcode byte of a first variable length macroinstruction and a first non-prefix opcode byte of a second variable length macroinstruction within said instruction buffer;

b) a first steering circuit, responsive to said first non-prefix opcode byte of said first macroinstruction, for steering a first predetermined number of non-prefix bytes from said instruction buffer to a first decoder, wherein said first predetermined number represents a maximum number of non-prefix bytes permitted in any macroinstruction; and c) a second steering circuit, responsive to said first non-prefix opcode byte of said second macroinstruction, for steering a second predetermined number of non-prefix bytes from said instruction buffer to a second decoder, wherein said first and second predetermined number of bytes are steered to said first and second decoders, respectively, substantially simultaneously.

13. The steering circuit of claim 12 further comprising:

d) a scanning circuit for scanning said instruction buffer to locate a first non-prefix opcode byte of a third macroinstruction within said instruction buffer; and e) a third steering circuit, responsive to said first non-prefix opcode byte of said third macroinstruction, for steering a third predetermined number of non-prefix bytes from said instruction buffer to a third decoder.

14. The steering circuit of claim 12 further comprising:

d) circuitry associated with said second decoder, for indicating whether the bytes within the second decoder can be decoded therein so that said second macroinstruction can be resteered to said first decoder using said first steering circuit.

15. The steering circuit of claim 14 further comprising:

e) a scanning circuit for scanning said instruction buffer to locate a first non-prefix opcode byte of a third macroinstruction within said instruction buffer; and f) a third steering circuit, responsive to said first non-prefix opcode byte of said third macroinstruction, for steering a third predetermined number of non-prefix bytes from said instruction buffer to a third decoder.

16. The steering circuit of claim 15 comprising control circuitry for supplying macroinstructions from said instruction buffer until all complete macroinstructions in said instruction buffer have been accepted for decoding within said decoders.

17. The steering circuit of claim 12, wherein said second predetermined number is less than said first predetermined number.

18. A steering method for steering multiple macroinstructions from a block of instruction code in an instruction buffer to a multiple instruction decoder in a processor, said steering method comprising the steps of:

A) locating a first non-prefix opcode byte of a first variable length macroinstruction within said instruction buffer;

B) steering a first predetermined number of non-prefix bytes from said instruction buffer to a first decoder in a first cycle beginning with said first non-prefix opcode byte of said first macroinstruction, wherein said first predetermined number represents a maximum number of non-prefix bytes permitted in any macroinstruction;

C) locating a first non-prefix opcode byte of a second variable length macroinstruction within said instruction buffer;

D) steering a second predetermined number of non-prefix bytes from said instruction buffer to a second decoder in said first cycle beginning with said first non-prefix opcode byte of said second macroinstruction;

E) locating a first non-prefix opcode byte of a third variable length macroinstruction within said instruction buffer;

F) steering a third predetermined number of non-prefix bytes from said instruction buffer to a third decoder in said first cycle beginning with said first non-prefix opcode byte of said third macroinstruction;

G) decoding the bytes within said first decoder;

H) determining if the bytes within said second decoder can be decoded; and

I) determining if the bytes within said third decoder can be decoded.

19. The method of claim 18 wherein step H further comprises the steps of:

H1) decoding the bytes within said second decoder if circuitry associated with said second decoder indicates that the bytes within said second decoder can be decoded therein;

H2) if said circuitry associated with said second decoder indicates that the bytes within said second decoder cannot be decoded therein, then, in a next cycle
   a) resteering said second macroinstruction to said first decoder, so that, responsive to said first non-prefix opcode byte of said second macroinstruction, said first predetermined number of non-prefix bytes beginning with said first non-prefix opcode byte of said second macroinstruction are steered from said instruction buffer to said first decoder, wherein said second macroinstruction becomes the first macroinstruction;
   b) resteering said third macroinstruction to said second decoder, so that, responsive to said first non-prefix opcode byte of said third macroinstruction, said second predetermined number of non-prefix bytes beginning with said first non-prefix opcode byte of said third macroinstruction are steered from said instruction buffer to said second decoder, wherein said third macroinstruction becomes the second macroinstruction;
   c) locating a first non-prefix opcode byte of a first subsequent variable length macroinstruction within said instruction buffer; and
   d) responsive to said first non-prefix opcode byte of said first subsequent macroinstruction, steering said third predetermined number of non-prefix bytes beginning with said first non-prefix opcode byte of said first subsequent macroinstruction from said instruction buffer to said third decoder, wherein said first subsequent macroinstruction becomes the third macroinstruction; and
   e) returning to step G.

20. The method of claim 19 wherein step I further comprises the steps of:

I1) decoding said third macroinstruction if circuitry associated with said third decoder indicates that the bytes within said third decoder can be decoded therein;

I2) if circuitry associated with said third decoder indicates that the bytes within said third decoder cannot be decoded therein, then, in said next cycle
   a) resteering said third macroinstruction to said first decoder, so that, responsive to said first non-prefix opcode byte of said third macroinstruction, said first predetermined number of non-prefix bytes are steered from said instruction buffer to said first decoder, wherein said third macroinstruction becomes the first macroinstruction;
   b) locating said first non-prefix opcode byte of said first subsequent variable length macroinstruction within said instruction buffer; and
   c) responsive to said first non-prefix opcode byte of said first subsequent macroinstruction, steering said second predetermined number of non-prefix bytes from said instruction buffer to said second decoder, wherein said first subsequent macroinstruction becomes the second macroinstruction;
   d) locating a first non-prefix opcode byte of a second subsequent variable length macroinstruction within said instruction buffer; and
   e) responsive to said first non-prefix opcode byte of said second subsequent macroinstruction, steering said third predetermined number of non-prefix bytes from said instruction buffer to said third decoder, wherein said second subsequent macroinstruction becomes the third macroinstruction; and
   f) returning to step G.

21. The method of claim 20 further comprising the step of:

J) repeating steps G through I until there are no bytes within any of said first, second, and third decoders to decode.

22. The method of claim 21 further comprising the steps of repeating steps A through J until all complete macroinstructions in said instruction buffer have been accepted for decoding within said decoders.

23. The method of claim 22 wherein step G further comprises the steps of:

1) if the bytes within the first decoder require more than one cycle for decoding, then performing the steps of:
   a) flushing the bytes within the second and third decoders to prevent issuance of decoded instructions therefrom; and
   b) returning to step A after decoding the bytes within the first decoder.

* * * * *